United States Patent [19]

Okajima et al.

[11] Patent Number: 5,473,396
[45] Date of Patent: Dec. 5, 1995

[54] DISPLAY APPARATUS AND METHOD OF MAKING THE SAME

[75] Inventors: Michio Okajima, Neyagawa; Takao Tohda, Ikoma, both of Japan

[73] Assignee: Matsushita Electric Industrial Co., Ltd., Kadoma, Japan

[21] Appl. No.: 117,597

[22] Filed: Sep. 8, 1993

[51] Int. Cl.⁶ .................................................. G03D 21/00
[52] U.S. Cl. ........................... 353/122; 348/786; 353/74
[58] Field of Search .................... 353/122, 74, 75, 353/77, 78; 359/47, 50, 443; 348/776, 778, 779, 780, 781, 782, 786, 787

[56] References Cited

U.S. PATENT DOCUMENTS

| | | | |
|---|---|---|---|
| 2,553,182 | 5/1951 | Cage | 348/786 |
| 4,031,542 | 6/1977 | Anderson. | |
| 4,339,659 | 7/1982 | Johnson | 250/213 VT |
| 4,714,956 | 12/1987 | Yin | 348/780 |
| 4,737,840 | 4/1988 | Morishita. | |
| 4,737,843 | 4/1988 | Spencer | 348/782 |
| 4,872,750 | 10/1989 | Morishita | 353/7 |
| 5,015,999 | 5/1991 | Imai et al. | 340/702 |

FOREIGN PATENT DOCUMENTS

| | | |
|---|---|---|
| 465171 | 1/1992 | European Pat. Off.. |
| 54-69328 | 6/1979 | Japan. |
| 54-89525 | 7/1979 | Japan. |
| 1307790 | 12/1989 | Japan. |
| 2199975 | 8/1990 | Japan. |

OTHER PUBLICATIONS

Watanabe et al, "A Color Flat–Panen Display Using Matrix Drive and Deflection System", SID 85 Digest, pp. 185–186, 1985.

D. A. Pinnow et al, "Photoluminescent Conversion of Laser Light for Black and White and Multicolor Display 2: System", Applied Optics, vol. 10, No. 1 Jan. 1971.

*Primary Examiner*—William A. Cuchlinski, Jr.
*Assistant Examiner*—William C. Dowling
*Attorney, Agent, or Firm*—Cushman, Darby & Cushman

[57] ABSTRACT

A novel type projection TV has a large size Fluorescent screen bearing three kinds of dots or stripes of fluorescent material which emits visible lights of red, green and blue at excitation by UV-rays, which are emitted from UV-emitting CRTs' for red, green and blue pixel of image, respectively; and a mask having UV-light passing apertures or a lens array is disposed on light paths of the UV-rays to improve color purity,

21 Claims, 11 Drawing Sheets

DISPLAY APPARATUS AND METHOD OF MAKING THE SAME

FIELD OF THE INVENTION AND RELATED ART STATEMENT

1. Field of the Invention

The present invention relates to a display apparatus and method of making it, and particularly concerns those for application in the field of projection type display apparatuses.

2. Description of the Related Art

Presently, display apparatuses of highest display quality are cathode ray tubes (CRTs). However, cathode ray tubes of a large picture size, particularly of above forty inches, have a large depth and large weight, and in addition a high brightness of picture is difficult to obtain. Furthermore, such a large size CRT has generally a low production yield in comparison with smaller size CRTs, thereby resulting in a very high cost. In recent years, in order to solve the above-mentioned problems, several types of great size picture display apparatuses have been proposed as substitute apparatus for the large size CRTs; For instance plasma displays, EL displays, liquid state displays, color flat panel displays (disclosed, e.g., in SID '85 Digest p185–p186, April, 1985), CRT projection type displays, liquid crystal projection type displays, etc.

The above-mentioned conventional flat panel display and projection type display of large size have the following problems:

1) Problems in flat panel display apparatus:
   Plasma display apparatus is generally of low efficiency and power consumption is large.
   Red phosphor and blue phosphor of high efficiencies to be used for high brightness EL color display apparatus are not yet available.
   The liquid crystal display has problems of signal delay due to wiring resistance and stray capacitance resulting from large-sizing and high manufacturing cost induced by complicated manufacturing process and low manufacturing yield.
   The color flat panel has problems of low display quality and time-deterioration of display quality to be induced by complicated configuration, large weight and large cost. That is, it is not yet difficult to realize a large size high brightness flat panel display apparatus of low power consumption with reasonable cost.

2) Problems in projection type display apparatus:
   The CRT projection type display apparatus has a difficulty of achieving high brightness of picture because of low light condensing efficiency of the lens system.
   The liquid crystal projection type display apparatus has problems of low aperture factor of liquid crystal panel and low permeability of a deflection filter and low light condensing efficiency of the lens system, and therefore, the liquid crystal projection type display necessitates a high power backlight in order to obtain a high brightness. The deflection filter and the liquid crystal require high durability against the high power light, and the total power consumption of the display system is high.
   Furthermore, these projection type display apparatus, although a large display can be made easier than those of CRT or flat panel display, its display picture quality is lower than the above-mentioned other ones because its image is produced by projecting the light from the light source to a screen from front side or back side, unlike the direct view type display apparatus such as CRT or flat panel display. Furthermore, in case a lenticular lens is provided on the screen for increasing brightness in the front direction, slant or oblique observation of the screen results in poor brightness, thereby decreasing its effective observation angle.

OBJECT AND SUMMARY OF THE INVENTION

The present invention provides a display apparatus which is of light weight, compact size, low power consumption, high display quality of a large size picture and manufactured in low cost, and method for making the same.

The present invention solves the above-mentioned problems by means of a display apparatus comprising:

a UV light source for emitting rays of UV image from its light emitting face, a projection lens system provided on paths of the rays of UV image for projecting a UV image of the light emitting face, and a fluorescent screen for emitting visible-lights when lit up by the rays of UV image through the projection lens system.

A preferred species of the display apparatus further comprises, besides the above-mentioned components, a light shield (or mask) which is disposed between the fluorescent screen and the projection lens and passes UV rays which are emitted by the light emitting face of the UV light source and projected through the projection lens. Or alternatively, a UV-deflection lens array may be provided between the fluorescent screen and the projection lens instead of the above-mentioned light shield (or mask).

A preferred method of manufacturing the fluorescent screen of the above-mentioned display apparatus in accordance with the present invention comprises the steps of:

disposing a pattern-exposuring light source at such a position that said UV light source is to be disposed for projecting said UV light image through said projection lens on a desired irradiating region on said fluorescent screen at a given position, disposing said mask or said lens array at such predetermined position as to make a predetermined gap from said fluorescent screen, disposing said fluorescent screen coated with a negative photoresist film containing a visible-light-emitting fluorescent material at said given position, exposing said negative photoresist film to said pattern-exposuring light source, and developing said photoresist film after said exposuring, thereby to obtain a desired pattern of said visible-light-emitting fluorescent material.

In principle, the display apparatus of the present invention has as its substantial elements, a face type or plane type UV light source (e.g. CRT) for emitting rays of a UV image from the face thereof, a projection lens, and a fluorescent screen. The UV rays of an image emitted from the facial UV light source are enlarged and projected onto the fluorescent screen, thereby to excite the fluorescent screen by the UV light to emit visible-light image thereon.

The display apparatus in accordance with the present invention is a direct viewing type apparatus wherein the visible-light-emitting fluorescent material disposed on the fluorescent screen is excited by ultra violet rays emitted from the UV light source through the projection lens.

That is, in the display apparatus in accordance with the present invention, the rays of UV image produced on the facial UV light source is directly enlarged by the projection lens so as to project the UV rays onto the fluorescent screen, whereon the fluorescent material excited by the UV rays converts the UV rays directly to visible-light image. The UV light source of facial type in accordance with the present invention is, for instance, a UV emitting CRT which has a funnel having a UV emitting fluorescent face, or may be an EL device wherein each light emitting element is UV emitting pixel regions.

Furthermore, in the display apparatus in accordance with the present invention, by providing the UV passing a mask or a UV deflecting lens array disposed between the fluorescent screen and the projection lens, the UV rays emitted from the UV light source and projected to the fluorescent screen by the projection lens are projected effectively and with good controllability, thereby to excite the visible-light-emitting fluorescent material on the large screen. That is, the UV rays emitted from the UV light source is projected being enlarged onto the large fluorescent screen. The UV rays pass the UV passing shield which is disposed with a given gap from the fluorescent screen towards the projection lens and the UV rays passing the mask or deflecting lens array irradiates the visible-light-emitting fluorescent material dots on the screen, thereby to emit the visible-light. A number of UV passing parts (apertures or slits) of the mask or the lens array is disposed in a manner that the UV rays passing through the projection lens and the UV shield or the lens array rightly emit the corresponding visible-light-emitting fluorescent material dots. Therefore, UV rays from particular facial UV light sources irradiate the intended corresponding visible-light-emitting fluorescent material dots on the large fluorescent screen. Therefore, intended particular visible-light image is produced without color distortion on the large visible-light fluorescent screen.

Figure 1:
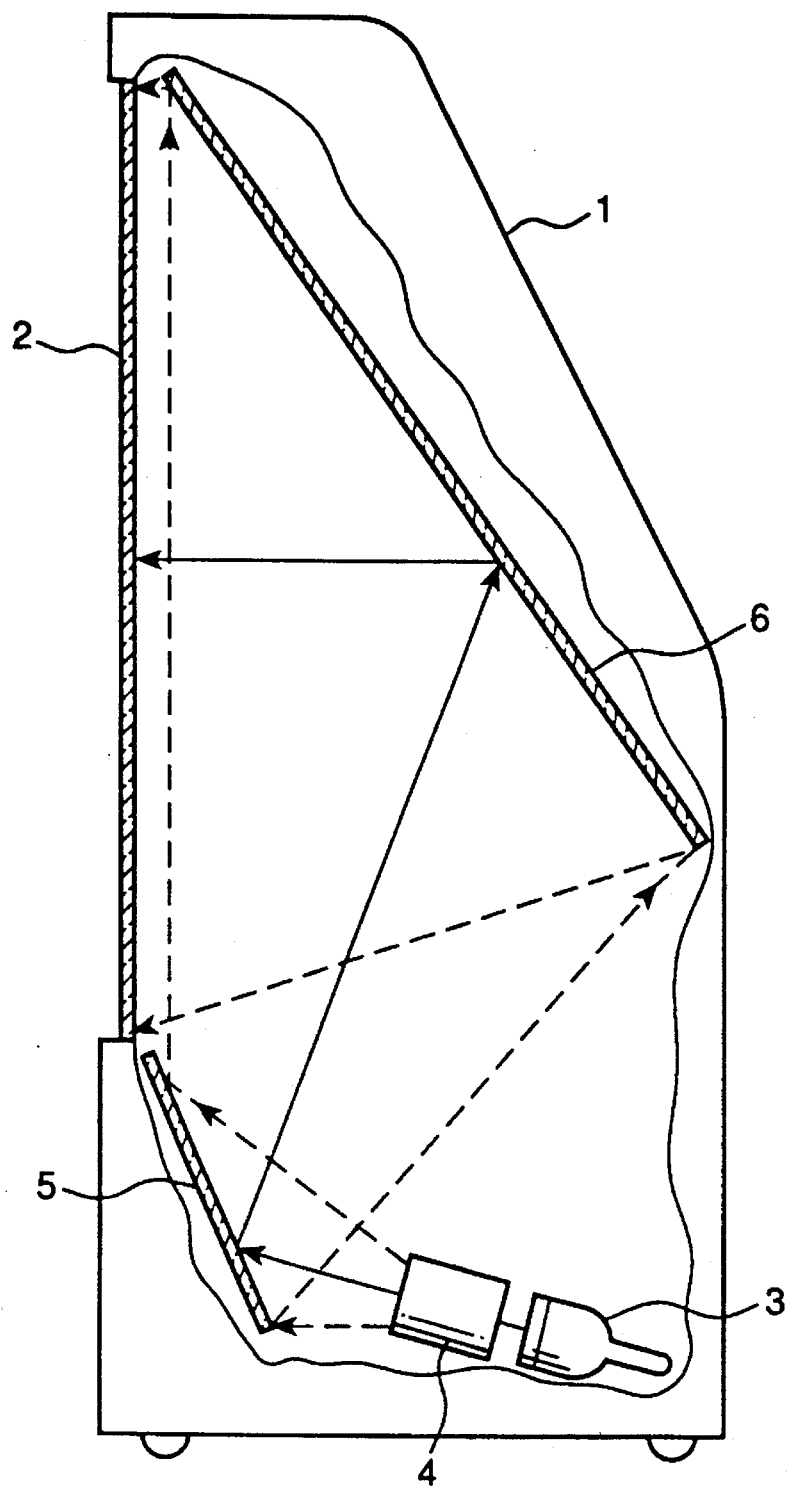
FIG. 1 is a cross-sectional view illustrating a constitution of one working example of a display apparatus of the present invention.

It will be recognized that some or all of the Figures are schematic representations for purposes of illustration and do not necessarily depict the actual relative sizes or locations of the elements shown.

DESCRIPTION OF THE PREFERRED EMBODIMENTS

For the UV light source of the present invention, a cathode-ray tube having UV-light-emitting materials which can emit UV light by electron-beam excitation can be used. Or alternatively, an electro-luminescent (EL) device including UV-light-emitting fluorescent materials, which emits UV light by an application of an electric field, can be applied.

The constitution of a display apparatus of the present invention is a kind of so-called indirect direct-viewing type, in which the UV light emitted from a UV planar light source is directly expanded onto a fluorescent screen to display pictures thereon. That is, the picture image information produced by the UV light is converted into a visible picture image. Accordingly, although the display apparatus of the present invention is a direct-viewing type, in comparison with a conventional CRT of course, or even compared with a conventional projection type, it is possible to make it light-weight and compact. And, compared with flat-panel displays, it can offer a low-cost and big display size display apparatus.

Explanation is given on an example that the UV light source of the present invention is a cathode-ray tube. When a cathode-ray tube is turned on, the electron beam emitted from an electron gun stimulates a UV-light-emitting fluorescent materials, which emit the UV rays toward the outside of a face plate thereof. Utilizing the UV rays thus produced as a stimulating light, by collimating it into a parallel beam by a projection lens placed in front of the cathode-ray tube, the UV rays are expanded and projected onto a fluorescent screen, which has a visible-light-emitting fluorescent material layer disposed on the front plane thereof. On the fluorescent screen, a fluorescent layer including a single or a plural number of kinds of visible-light-emitting fluorescent material is disposed, a specified visible-light-emitting fluorescent material is stimulated via the projection lens, thereby a specified color is emitted. Therefore, by inputting a specified video signal to the above-mentioned cathode-ray tube, monochromatic or color picture images can be displayed on the above-mentioned fluorescent screen.

That is, the present invention enables realizing big display at low cost by means of expanding and projecting the stimulating light from the cathode-ray tube. Further, since it is a direct-viewing type in which a screen itself emits light by the stimulating light, its display quality is excellent. That is, according to the present invention, a light-weight, compact and low-cost, and a big display size display apparatus having a high display quality can be realized.

In particular, when the UV light source of the present invention is a cathode-ray tube, and in addition thereto, when an electron-beam is projected on a fluorescent plane having a constitution of an optical resonator comprised of a pair of mirrors, and the mirrors being provided in a manner that they are facing to each other From both sides of the UV-light-emitting layer, then the UV-light-emitting layer emits the UV light. This UV light repeats the reflections between the above-mentioned reflecting mirror pair, and makes the above-mentioned UV-light-emitting layer emit the stimulated emission of the UV light. When the power of the electron beam is raised beyond a certain threshold value, the laser oscillation takes place, and this is preferable for the action of this cathode-ray tube. The threshold value can be determined by the qualities of the optical resonator and the UV-light-emitting fluorescent materials and others.

The laser light is passed partly through a semi-transparent or translucent reflecting mirror and radiated to outside. The laser light is emitted with an excellent parallelism in the direction which is perpendicular with respect to the mirror surface and within a narrow divergence angle, which is determined mainly by its oscillation wavelength and the area of light-emitting regions. Since the divergence angle of the laser light is narrow, the light can be projected on the fluorescent screen efficiently through the projection lens. The visible-light-emitting fluorescent materials of the fluorescent screen are stimulated with this UV laser light, and visible range spontaneously emitted light of specified colors is emitted. That is, according to the present invention, light-weight, compact, low-cost, high quality, and also high brightness, low-power consumption big display size display apparatus can be realized.

Actions of a case in which a UV light source of the present invention is an electro-luminescent EL device, are explained. When an AC electric field, for example, is applied across the electrodes of an EL device, the UV light is emitted by the electro-luminescent light emission action in the UV-light-emitting layer. This UV stimulating light is passed through a transparent or semi-transparent electrode toward the outside. Utilizing the UV rays thus produced as stimulating rays, after collimating them into a parallel beam by a projection lens placed in front of the EL device, the UV rays are expanded and projected onto a fluorescent screen. On the fluorescent screen, a fluorescent layer including a single or a plural number of kinds of visible-light-emitting fluorescent material is disposed; and a specified visible-light-emitting fluorescent material is stimulated via the projection lens, thereby to emit a specified color. Therefore, by inputting a specified video signal to the above-mentioned cathode-ray tube, monochromatic or color picture images can be displayed on the above-mentioned fluorescent screen.

As for the UV-light-emitting fluorescent material which is applicable to the present invention, diamond, silicon carbide, III-V semiconductor compounds such as GaN, AlN, or BN, or IIb-VI semiconductor compounds such as ZnO, ZnSe, ZnS, or CdS or IIa-VI semiconductor compounds such as MgS, CaS, SrS, or BaS, or chalcopyrite compounds such as $CuAlS_2$, or manganese chalcogenite compounds such as MnTe, MnSe, or MnS, or multi-nary compounds including at least those compounds mentioned above, can be used. In accordance with the necessity, it is also possible to use those compounds mentioned above to which donor impurity or acceptor impurity was added. Particularly, if a donor impurity or an acceptor is added, it is preferable because the light-emission efficiency is raised.

As for the UV-light-emitting fluorescent material which is applicable to the present invention, the following are also mentioned as examples: phosphate fluorescent materials such as $Ca_3(PO_4)_2:Tl^+$, or silicate fluorescent materials such as $BaSi_2O_5:Pb^{2+}$, $(Ba Sr, Mg)_3Si_2O_7:Pb^{2+}$, $Ca_2MgSi_2O_7:Ce^{3+}$, $Zn_2SiO_4:Ti$, or so-called luminescent-center-ion-containing fluorescent materials of such as phosphate fluorescent materials like $SrB_4O_7F:Eu^{2+}$, or yttrium oxide compounds tungsten oxide compounds, aluminum oxides, rare-earth oxide, IIa-VII$_2$ compounds, IIb-VII$_2$ compounds, or alkali halogenides.

Among such the UV-light-emitting fluorescent materials, those ions of which luminescent-center impurity are lanthanoid ions or actinoid ions having an unclosed f-electron orbit, the light-emitting efficiency becomes high and hence the laser oscillation becomes easy to oscillate, and it is preferable.

In particular, as for the luminescent-center impurity, gadrinium ions are preferable. That is, in the energy levels of gadrinium ions, an electric dipole transition between the ground level ($^8S_{7/2}$) and a first excited level ($^6P_{7/2}$) is an f—f transition, and hence it is essentially a forbidden transition similarly as in other lanthanoids; but in a matrix crystal, it suffers the influence of the crystal field and becomes an allowed transition. In addition to this, the matrix material is transparent or semi-transparent for the fluorescent light from the transition between $^6P_{7/2} \rightarrow ^8S_{7/2}$. Therefore, if the gadrinium ions are used as for the luminescent centers of the fluorescent materials for the cathode-ray tube or the thin film EL light-emitting device, fluorescent emission in the UV range associated with the $^6P_{7/2} \rightarrow ^8S_{7/2}$ transition can be emitted. Consequently, a UV light laser of around 300 nm can be brought into oscillation.

As for the luminescent-center impurity, other than those having an unclosed f-electron orbit mentioned above, transition-metal ions having an unclosed d-electron orbit can also be used.

When the band gap of these UV-light-emitting fluorescent materials at the room temperature is more than 3.1 eV, UV light having wavelength of less than 400 nm can be emitted, and it is preferable.

In the-display apparatus of the present invention, the visible-light-fluorescent material is excited by UV light; therefore the provision of a UV cut filter on outside face of the fluorescent screen, that is, on the opposite side to the projection lens with respect to the fluorescent screen, is preferable to prevent leakage of UV light toward the viewer of the display apparatus. Furthermore, by provision of the UV reflection mirror outside the fluorescent screen, that is, on the opposite side to the projection lens with regard to the fluorescent screen, the outside leaking UV light can be reflected toward the fluorescent screen. Thereby the fluorescent material is excited again by the reflected UV light, and therefore the light emission efficiency of the visible-light is improved.

The UV cut filter and the UV reflection mirror can be provided at the same time, and in this case the UV cut filter should be disposed outside the UV reflection mirror (a UV reflection mirror).

Furthermore, by providing a visible-light reflection mirror between the fluorescent screen and the projection lens in this display apparatus, useless inward emitted visible light from the fluorescent screen toward the projection lens can be reflected to the fluorescent screen. Thereby, brightness of the resultant image of the visible light from the screen outside to the viewer can be improved.

Of course, the display apparatus in accordance with the present invention is applicable to plural color display apparatus. In such case, in order to afford the plural color display, the display apparatus must comprise plural UV light sources of the number of colors to be used, plural projection lens corresponding to respective UV light sources, and a fluorescent screen including visible-light emitting fluorescent materials of the corresponding number of colors. Particularly for the display apparatus having a plurality of colors, by providing a light mask with the UV light passing parts at a position between the fluorescent screen and the projection lens or a lens array For deflecting the UV light between the same position, it is possible to obtain irradiation to fluorescent material of the right color by the corresponding right UV rays projected through the projection lens with good controllability. That is, UV rays generated from a plurality of UV pixels on the facial UV light source are made into parallel rays and expanded by the projection lens, and the UV rays which have passed the projection lens pass through UV light passing parts of the mask, which is disposed apart from the fluorescent screen face with a predetermined small gap, or through a lens array for deflecting the UV rays; in this operation, the UV rays emitted from the UV pixel on respective UV light source reaches the UV light passing parts of the mask, and then, comes to the fluorescent screen. In such case, since the respective UV light sources are disposed at each other different positions, the light beams arriving at the UV light passing parts have respectively different incident angles from each other. Accordingly, the final arriving positions on the fluorescent screen of the respective UV rays, which are for each other different colors originated from different UV light source, are each other different. Since the UV light passing parts of the UV mask or the lens array for deflecting UV rays are disposed in such a relation that the UV rays from the respective UV light source irradiate the fluorescent material dots or stripes of a predetermined one color, the light beam from a predetermined UV light source irradiates correspondingly predetermined visible-light fluorescent dots of the corresponding color. Therefore, by means of the function of the UV mask or the lens array, no color confusion nor color misregistration is generated in the display apparatus of the embodiment.

The display apparatus comprising the UV light mask in combination with the visible-light-emitting fluorescent screen is produced in the following manufacturing method:

First, a pattern exposing light source is provided at such a position that said UV light source is disposed for projecting the UV light image through the projection lens on a desired irradiating region on the fluorescent screen at a given position.

Then the mask or lens array is disposed at such predetermined position as to make a predetermined gap from the fluorescent screen.

Thereafter, said fluorescent screen coated with a negative photoresist film containing a visible-light-emitting fluorescent material is disposed at the given position.

Then, the negative photoresist film is exposed to the pattern exposing light source.

Finally, the photoresist film is developed after the exposing, thereby to obtain a desired pattern of the visible light-emitting fluorescent material.

In actual case, a negative photoresist, wherein visible-light-fluorescent material for emitting fluorescence of desired wavelength is blended, is coated on a substrate of the screen. Then the pattern-exposuring light source is lit to emit light. The light emitted from the exposing light source is made parallel and expanded when passing the projection lens. The rays irradiate the mask and then pass the UV light passing parts, i.e., apertures of the mask, or pass through the lens array, and project such a pattern on the screen face coated by the negative photoresist as is of similar figure to the pattern of the UV passing part of the mask or lens array. The UV rays which are irradiated on the screen make photochemical reaction off the negative photoresist containing the visible-light-emitting fluorescent material, and therefore the negative photoresist containing visible-light-emitting fluorescent material acquires a latent image of the desired pattern. After washing the exposed screen, the negative photoresist of the parts which are not exposed to the light is removed together with the visible-light-emitting fluorescent material, and thus the development is made, to produce the phosphor screen. The relative position of irradiation of the pattern on the screen is determined by incident direction of the rays, incident angle, distance or gap from the fluorescent screen to the mask or to the lens array.

The method of making fluorescent screen in accordance with the present invention is advantageous particularly in the case of a plural color display apparatus. The difference of method of the fluorescent screen manufacturing of plural color displaying from that of the single color displaying is that the former method requires the same number of light exposing light sources as the number of light colors to display and that the same number of visible-light-emitting fluorescent materials are necessary contrary to single ones in the single color displaying; other parts and components can be made similarly.

At first, a negative photoresist blending therein a visible-light-emitting fluorescent powder A of a desired color emission is coated on a fluorescent screen. Next, a photochemical light source as the exposing light source "a" which is positioned at the equivalent position to the UV light source (which is corresponding to visible-light-emitting fluorescent powder A) is energized to emit the exposing light. The exposing light emitted from the exposing light source "a" is made into parallel rays and then expanded by the projection lens. Then the expanded rays irradiate the mask and pass the UV light passing apertures of the mask or pass the lens array, and then make a patterned image which is of similar figure to the UV light passing apertures or lens array. The patterned irradiated rays projected on the screen and harden the negative photoresist and to fix a pattern $\alpha$ of the visible-light-emitting fluorescent powder A on the screen. The position of the pattern $\alpha$ of the visible-light-emitting fluorescent powder A is determined similarly to the aforementioned case of singular color visible-light-emitting fluorescent material, by incident direction of rays, incident angle, gap between the phosphor screen and the UV light passing apertures or lens array. By washing the exposed screen, the negative photoresist of the parts other than the exposed parts are removed together with the visible-light-emitting fluorescent powder A blended therewith, and thereby the desired pattern $\alpha$ of the visible-light-emitting fluorescent powder A is produced.

Next, a negative photosensitive resist wherein another visible-light-emitting fluorescent powder B of different color emission from that of the above-mentioned visible-light-emitting fluorescent powder A is coated on the fluorescent screen. Then the second exposing rays source "b" which corresponds to the visible-light-emitting fluorescent powder B and disposed equivalently with the UV rays source is energized to emit exposing rays. By energization and exposing, in the same manner as in case of the visible-light-emitting fluorescent powder A, the exposing rays emitted from the exposing rays source "b" is made into parallel rays and then expanded by the projection lens, and irradiates the mask or lens array. Some part of the exposing rays pass the UV light passing apertures or the lens array. Then the screen is exposed by the pattern which is of similar figure with the UV light passing path apertures or lens array pattern, and the exposing rays hardens the negative resist containing the visible-light-emitting fluorescent powder B. Thus the patterned exposing light fixes the visible-light-emitting fluorescent powder B of the exposed pattern on the screen. Therefore, by washing the exposed screen, and removing the negative photoresist containing the visible-light-emitting fluorescent powder B at the parts other than the exposed parts, the fluorescent screen comprising two kinds of the dots or stripes of the visible-light-emitting fluorescent powders A and B is produced.

Since the exposing light source "a" and the other exposing light source "b" are disposed with a predetermined distance from each other, the incident directions and incident angles of the rays coming from respective exposing light sources to the same UV passing aperture or the same lens of the lens array are different. That is, the position whereto the rays from the exposing light source "b" are projected on the fluorescent screen is different from the position whereto the rays from the exposing light source a are projected. Therefore, the position of the pattern β of the second visible-light-emitting fluorescent powder B formed by the exposing of the rays from the second exposing light source "b" is different from the position of pattern α of the first visible-light-emitting fluorescent powder A. By carrying out the processes for respective color lights of display by respective exposing light source, it is possible to obtain respective patterns of visible-light-emitting fluorescent powders of respective colors.

According to the above-mentioned method of manufacturing the fluorescent screen, the pattern of visible-light-emitting fluorescent powder formed on the screen is made by the exposing rays which travels on the same path as the UV rays at operation of the display apparatus. Therefore naturally, the UV rays which irradiate the pattern of visible-light-emitting fluorescent powder is very accurate of registration, and hence, the efficiency of excitement of the visible-light-emitting fluorescent powder dots by the UV light from the UV light source is very high as theoretically designed. Furthermore, it is desirable that to use the UV light source for exciting the visible light emitting fluorescent powder dots by using the operating UV light source for the exposing, it is most simple that the display apparatus itself is used as the pattern exposing apparatus.

Particularly in case the fluorescent screen has visible-light-emitting fluorescent powder dots for plurality colors, forming of black mask or black matrices to surround the phosphor dots is desirable to increase the color contrast by preventing the mixing of different colors.

The fluorescent screen having the above-mentioned black matrices is made by coating black layer of photosensitive positive photoresist which contains therein black pigment Such as carbon powder or the like, on the fluorescent screen whereon necessary kinds of visible-light-emitting fluorescent powder patterns are already coated. The fluorescent screen covered by the above-mentioned positive photoresist containing the black pigment is then exposured by energizing the whole exposing light sources which have been used to exposure for making respective color dots. Thereafter, the exposed fluorescent screen is washed as a developing, thereby to remove the positive photoresist which contains the black pigment at the part over respective fluorescent material powder dots. The above-mentioned sequence of manufacturing step forms the black matrices layer at the parts other than the visible-light-emitting fluorescent material dots pattern of respective colors.

Hereafter, the present invention is elucidated referring to concrete working examples.

WORKING EXAMPLE 1

A cross-sectional view of a first working example of the display apparatus of the present invention is shown in FIG. 1. In front of an enclosure or a console box 1, a fluorescent screen 2 is provided. And at a predetermined position in the console box 1, a cathode-ray tube 3 is provided. And a projection lens 4, reflecting mirrors 5 and 6, are provided at their respective appropriate positions so that the rays radiated from the front face of the cathode-ray tube 3 are expanded and projected on the fluorescent screen 2.

Figure 2:
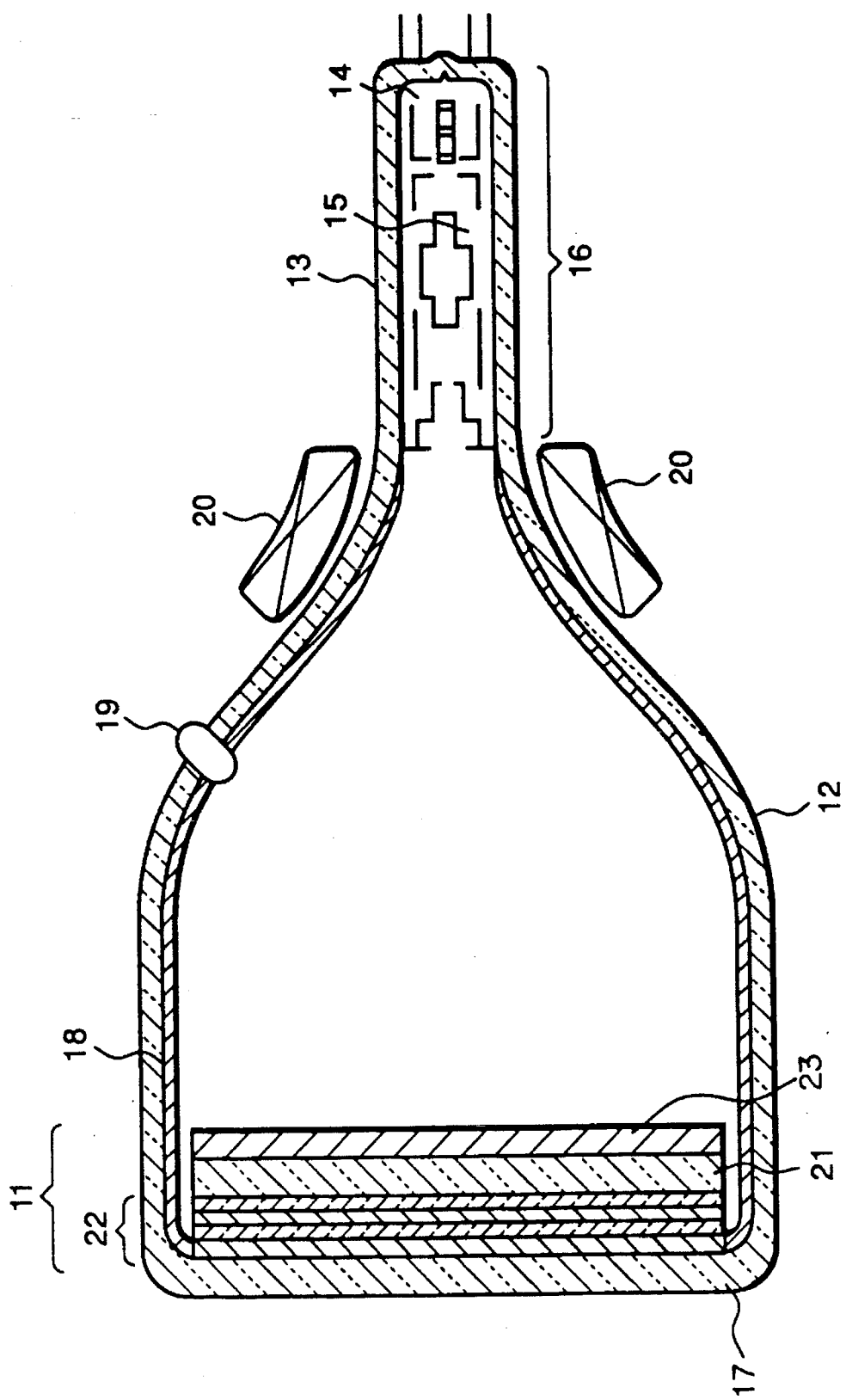
FIG. 2 is a cross-sectional view of a cathode-ray tube to be used in one working example of a display apparatus of the present invention.

A cross-sectional view of the cathode-ray tube 3 using the present working example is shown in FIG. 2. The cathode-ray tube 3 has a similar constitution of an ordinary cathode-ray tube, except for an ultra-violet (UV)-light-emitting fluorescent screen 11 on the face plate 17. At a neck part 13 of a glass bulb 12, inside of which is kept to the high vacuum, an electron gun 16 comprising a cathode 14 and an electron lens 15 is provided. Over the inside face of a face plate 17, a UV-light-emitting fluorescent screen 11 is provided, and it is made to be electrically conducting to an inner conducting film 18 which is made by a processing of giving conductivity on a predetermined region of the inner surface of the glass bulb 12, so that a predetermined voltage can be applied through an anode button 19. And, on the neck part 13, a deflection yoke 20 is mounted. In place of the glass bulb 12, other materials such as metal can be used partly depending on the necessity.

The UV-light-emitting fluorescent screen 11 comprises a UV-light-emitting fluorescent material layer 21 of a thickness of approximately 100 nm to 100 μm, a multi-layer reflecting mirror 22 of a total thickness of approximately 100 nm to 100 μm is provided on the face plate side, and a metallic reflecting mirror 23 of a film thickness of several 10's to several 100's nm provided similarly on the electron gun side. The metallic reflecting mirror 23 is made so as to be electrically conducting to the inner conducting film 18.

As a species of working example, explanation is given on a case that, a single-crystal film of zinc sulfide is used for the UV-light-emitting fluorescent material layer 21; and a multi-layer film is made by stacking composite film composed of $SiO_2$ thin films and $TiO_2$ thin films as many layers as several periods to several tens periods. The film thickness of respective dielectric material films were set to such values that which are close to an odd-number times of respective quarter-wavelengths in respective materials of emitted light. And for the metallic reflecting mirror 23, an aluminum evaporation-deposited film was used. For the face plate 17, a glass plate through which UV-light emitted from the fluorescent screen 11 can transmit was used.

Figure 3:
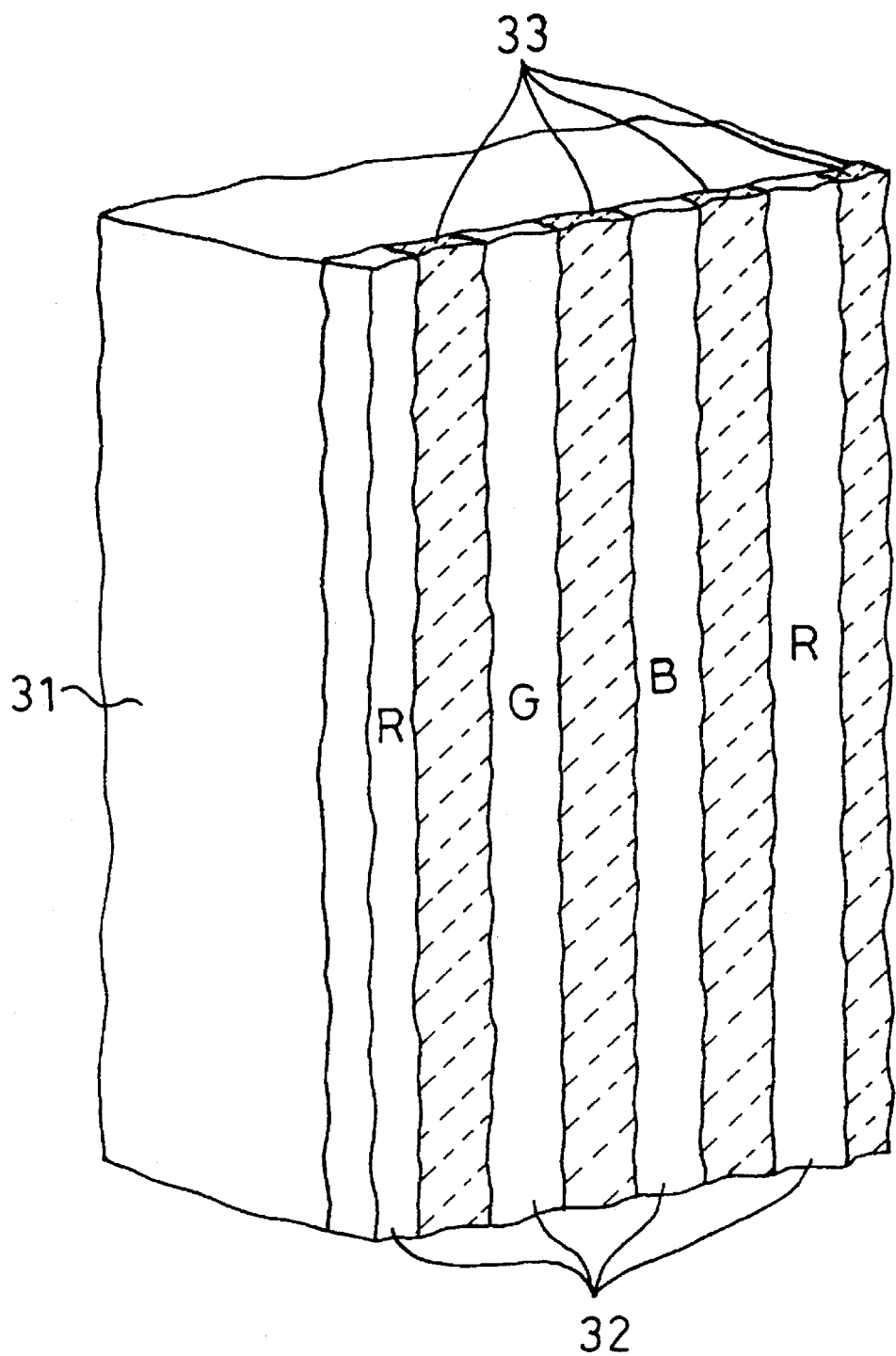
FIG. 3 is a perspective view of a fluorescent screen used in one working example of a display apparatus of the present invention.

In FIG. 3, as one working example of the display apparatus of the present invention, a color display apparatus is taken up, together with a perspective view of a fluorescent screen of this display apparatus is shown. The size of the fluorescent screen of the present working example is such that which is more than 40 inches in the diagonal dimension, which is sizes of so called big size screen. The fluorescent screen comprises a screen substrate 31, belt-shaped visible-light-emitting fluorescent material stripes 32 formed periodically keeping a specified space over its console box inner surface, and black matrices 33 formed on the spaces between those visible-light-emitting fluorescent material stripes 32.

The visible-light-emitting fluorescent material stripes 32 are arranged in an order, for example, red light-emitting fluorescent material (R), green light-emitting fluorescent material (G), blue light-emitting fluorescent material (B), and again red light-emitting fluorescent material (R) . . . . For the screen substrate 31, a plastic or glass plate which is transparent for these visible-lights can be applied, here in the present working example, a glass plate was used.

For red, green, and blue visible-light-emitting fluorescent material stripes 32, visible-light-emitting material powders respectively of $Zn_{0.2}Cd_{0.8}S:Ag$, $Zn_{0.6}Cd_{0.4}S:Ag$, and $(Sr, Ca)_{10}(PO_4)_6Cl_2:Eu$ were used. Hereupon, for these visible-light-emitting fluorescent materials, there is no particular restriction for their employment, any fluorescent materials emitting respectively red, green, and blue can be used.

For the black-coloring material for the black matrices 33, carbon powder was used. For this also, there is no restriction for the material, any black-colored or any equivalent material having light-absorbing capability can be used.

Workings of the present working example shown in FIG. 1 to FIG. 3 are explained below. A positive voltage of around from several kV to 100 kV with respect to the potential of the cathode 14 is applied to the fluorescent screen 11, and thereby electron beam emitted from the electron gun 16 is collimated to a specified beam diameter, accelerated and then is shot onto the fluorescent screen 11. The electron beam is deflected by function of the deflection yoke 20 to which a deflection signal is inputted, and thereby it is scanned over the fluorescent screen with a specified period. A video signal is inputted to the electron gun 16.

The electron beam is irradiated to the UV-light-emitting zinc sulfide fluorescent material layer 21 through the metallic reflecting mirror 23, and thereby the matrix in which the UV-light-emitting fluorescent material is dispersed is excited. Then, zinc sulfide emits UV-light of a wavelength of, for example, around 340 nm which corresponds to the energy of exciton's transition or the energy of transition across the band gap.

For the UV-light-emitting fluorescent material layer 21, in order to let it emit the UV-light efficiently it is preferable to use a high quality single crystal film which includes little non-radiative centers such as lattice defects.

The multi-layer reflecting mirror 22 and the metallic mirror 23 provided on both sides of the UV-light-emitting fluorescent material layer 21 in a manner that they sandwiched the UV-light-emitting fluorescent material layer 21 have a high reflectance for the emitted UV-light from the UV-light-emitting fluorescent material layer 21. And hence the multi-layer reflecting mirror 22 and the metallic mirror 23 together act as an optical resonator for the emitted UV-light. That is, at the time of emission of the UV-light, the UV-light is bounced back and forth between the reflecting mirrors 22 and 23, stimulating further the UV-light-emitting fluorescent material layer 21 to emit UV-light of almost the same wavelength. Hereupon, when the power density of the electron beam is raised beyond a certain threshold value, the laser oscillation takes place. The laser light is passed partly through the multi-layer reflecting mirror 22 and radiated to outside. The laser light is emitted with an excellent parallelism in the direction which is perpendicular with respect to the mirror surface and within a narrow divergence angle which is determined mainly by its oscillation wavelength and the area of light-emitting regions. The laser light is passed through the face plate 17 and radiated in the forward direction of the cathode-ray tube 3.

It is desirable to set the film thickness of the UV-light-emitting fluorescent material layer 21 in a manner that the energy conversion efficiency from the input to the laser light output becomes highest at a specified driving condition. Practically, a film thickness is set so that, for a given electron beam reachable depth, energy of the electron beam can be absorbed as effectively as possible by the UV-light-emitting fluorescent material 21, and at the same time, loss associated with the reflection and absorption inside the optical resonator can be reduced as low as possible. For the film thickness of the metallic reflecting mirror 23, it is desirable to set it to its optimum value so that the reflectance for the light emission of the UV-light-emission fluorescent material layer 21 is sufficiently high and at the same time the transmittance for the electron beam becomes as high as possible. In the present working example, the reflectance for the UV-light-emission of the metallic reflecting mirror 23 was about 80%. The number of lamination of the multi-layer reflecting mirror 22 was set so that the reflectance for the UV-light became more than 90%. To reduce the threshold power density for the laser oscillation, it is desirable to use a low loss high quality single crystal film for the UV-light-emitting fluorescent material layer 21, and at the same time to keep the reflectance of those two mirrors as high as possible.

As shown in FIG. 1, the laser light emitted from the cathode-ray tube 3 is expanded during travelling through the projection lens 4, the reflecting mirror 5 and the reflecting mirror 6, and projected on the fluorescent screen 2 efficiently.

The UV-light projected on the fluorescent screen 2 stimulates the visible-light-emitting fluorescent materials of the visible-light-emitting fluorescent material stripes 32 to emit respective colors of those stripes efficiently. These visible-lights are radiated diffusively through the screen substrate 31 to the screen front face.

The layer thickness of the visible-light-emitting fluorescent powder of the fluorescent material stripes 32 is set to its optimum thickness so that it absorbs the UV laser light efficiently, and it can emit light in the frontward direction also efficiently.

The UV laser light stimulates the visible-light-emitting fluorescent material stripes for red, green, and blue color successively while it scans over the Fluorescent screen 2. To the cathode-ray tube 3, video signal is inputted in a manner to emit the UV laser light outputs, which corresponds respectively to successive R- G- and B-brightness signals. That is, the UV laser light is scanned synchronously so that when the laser light of the light output corresponding to the R-signal, for example, is emitted, it scans just the red fluorescent material stripe.

The area of the electron beam scanning over the fluorescent screen 11 of the cathode-ray tube 3, the spot diameter of the electron beam, and the input power were determined and set so as to fulfill the requirements for the brightness as well as for the resolution which are required for the displayed picture on the fluorescent screen 2.

The display apparatus of the present working example which has been described above was driven and tested under a specified condition, and the result showed that an excellent display quality including features such as high contrast, which was obtainable because of the light-emission nature of the fluorescent screen 2 as its own capability, could be obtained.

And, since the divergence angle of the laser light emitted from the cathode-ray tube 3 is narrow, the projection lens 4 can collect the light from the cathode-ray tube 3 with a high light-collecting power of more than 80% and can project it on the fluorescent screen 2 very efficiently.

The light-emission of the conventional projection tube having a conventional fluorescent material face plane was made in a diffusive manner governed by the spontaneous emission from the fluorescent material face plane. Therefore, even the light was collected by using an optimally designed projection lens, its light-collecting power remained as low as around 10%. Compared with a display apparatus having such conventional projection tube, the display apparatus of the present invention can be said to have a far better light-collecting power. That is, even subtracting the loss occurring at the time elf energy conversion from the UV-light to the visible-light at the fluorescent screen 2, the display apparatus of the present invention can provide a display with much higher efficiency and higher brightness. Consequently, even without employing a lenticular lens array that was heretofore employed on the screen for raising the brightness for the direct forward direction of the screen in the conventional projection type display, a sufficiently high brightness can be obtained. As has been explained above, the display apparatus of the present invention is different from the conventional projection type display; that is, since the display light of the present invention apparatus is emitted diffusively in the frontward direction, the viewing angle of the display apparatus is wide enough and hence it can provide a display which can be seen from almost any direction.

As has been described above, according to the present invention, which has been shown in the above working example, a big display-size display apparatus of light weight, compact, low cost, in particular, of high picture quality, high brightness, and low power consumption can be realized.

Next, making method of the fluorescent screen 11 of the display apparatus of the present working example is explained below.

First, over a GaAs single crystal substrate (100) surface, ZnS single crystal epitaxial film was grown as thick as a specified thickness by molecular beam epitaxial growth method, and thereby a UV-light-emitting fluorescent material layer 21 was made. As for an evaporation source, high purity ZnS polycrystalline grains were used. At the thickness more than a specified film thickness, a sufficiently good crystal quality film was obtained.

Next, thereover $SiO_2$ layers and $TiO_2$ layers were alternately evaporation-deposited using the electron beam deposition method, thereby the multi-layer reflecting mirror 22 was completed.

The GaAs substrate on which the UV-light-emitting fluorescent material layer 21 and the multi-layer reflecting mirror were completed was bonded so that the multi-layer reflecting mirror 22 side faces to the face plate 17. The bonding was processed by coating a transparent material such as a polyamide group resin uniformly and thinly over the flat face plate, and then placing the above-mentioned substrate thereon and applying heat on it.

Next, the GaAs substrate on which the face plate was bonded thereon was immersed in such an etching solution that which etches GaAs only for a specified time period, and thereby the GaAs substrate was removed. For the etching solution, for example, a mixed solution of hydrogen peroxide aqueous solution and liquid ammonia was used. On the surface of the UV-light-emitting fluorescent material layer 21 appearing after the removal of the GaAs substrate, aluminum was evaporation-deposited by a specified film thickness, and thereby the metallic reflecting mirror 23 was formed. By the process described above, the fluorescent screen 11 was completed.

For the formation of the fluorescent material stripes 32, a printing method was applied. That is, fluorescent powders mixed with a binder which absorbs little of UV-light emitted from the cathode-ray tube were printed, separately color by color, over the screen substrate 31, and thereby the fluorescent material stripes 32 were completed.

Besides the above, using a heat-resistive material such as glass, for example, as for the screen substrate 31, it is also possible to remove the binder by heating the fluorescent screen 2.

Another working example of making method of the UV-light-emitting fluorescent screen 11 is shown below. By bonding a ZnS single crystal substrate to a bed plate, then polishing out its surface until it becomes a specified thickness, a multi-layer reflecting mirror 22 composed of $SiO_2$ layers and $TiO_2$ was completed thereon by a film forming method which was similar to that used in the working example described above. Then, this was bonded to the face plate 17 so that the multi-layer reflecting mirror 22 side faced thereto. Next, the above-mentioned bed plate was removed from the ZnS single crystal substrate. Then, on the surface over which the UV-light-emitting fluorescent layer 21 was exposed, aluminum was evaporation-deposited by a specified film thickness, thereby the metallic reflecting mirror 23 was formed.

Hereupon, in the present working example, although ZnS was used as the material for the UV-light-emitting fluorescent material layer 21, other material, whose band gap energy is above 3.1 eV at the room temperature and capable of emitting the UV-light efficiently by the illumination of electron beam, can also be used. Actually, as for the UV-light-emitting material layer 21, diamond, III-V compounds such as SiC, GaN, AlN, or BN, or IIb-VI compounds such as ZnO, or IIa-VI compounds such as MgS, CaS, SrS, or BaS, or chalcopyrite compounds such as $CuAlAS_2$, or manganese chalcogenite compounds such as MnTe, MnSe, or MnS, or multinary compounds including at least those compounds mentioned above, can be used. And according to the necessity, it is also possible to use those compounds mentioned above to which donor impurity or acceptor impurity was added.

And, it is also possible to use so-called luminescent-center-ion-containing type UV fluorescent materials such as phosphate fluorescent materials like $Ca_3(PO_4)_2$:$Tl^+$, or silicate fluorescent materials like $BaSi_2O_5$:$Pb^{2+}$, (Ba, Sr, Mg)$_3Si_2O_7$:$Pb^{2+}$, $Ca_2MgSi_2O_7$:$O_7$:$Ce^{3+}$, $Zn_2SiO_4$:Ti, or fluorescent materials like $SrB_4O_7F$:$Eu^{2+}$.

For the matrix materials into which the Fluorescent material is dispersed, yttrium oxide compounds, tungsten oxide compounds, or aluminum oxide, or rare-earth oxide, or IIa-VII$_2$ compounds, or IIb-VII$_2$ compounds, or alkalihalide can also be used.

And, for the luminescent-center-ions, among those ions capable of emitting fluorescent light in the UV region in a specified matrix material, those ions fulfilling the requirement of capability of emitting the UV-light efficiently such as lanthanoid ions or actinoid ions having an unclosed f-electron orbit, or transition metal ions having an unclosed d-electron orbit can be employed.

In particular, dispersing $Gd^{3+}$ as the luminescent-Center-ions into a matrix crystal of, for example, $ZnF_2$, with a specified concentration, and the UV-light-emitting fluorescent layer 21 is formed using the above matrix crystal. When the cathode-ray tube 3 is formed using the above-mentioned UV-light-emitting fluorescent layer 21 and tested, a UV-light laser oscillation of near a wavelength of around 310 nm could be obtained on the fluorescent screen 11 by the electron beam excitation. At that time, other parts of such as the multi-layer reflecting mirror were also designed and made becoming optimum at this wavelength. Then by using this cathode-ray tube for the above-mentioned display apparatus, a high quality big display-size display apparatus having a similar performance with the working example described above could be realized.

Next, making of this UV-light-emitting fluorescent material layer 21 has been done as is described below. First, over a GaAs single crystal substrate (100) surface, $ZnF_2:Gd^{3+}$ film was grown by the molecular beam epitaxial growth method. As for an evaporation source, $ZnF_2$ grains and $GdF_3$ grains were used. The multi-layer reflecting mirror 22 and the metallic reflecting mirror 23 were made by the similar method as in the working example described before.

Apart from the above-mentioned working example wherein a dielectric multi-layer film made of $SiO_2$ layers and $TiO_2$ layers was used as the multi-layer reflecting mirror 22, other combinations of dielectric materials can also be possible, provided that the refractive indices of these dielectric materials are different from each other and they are transparent or semi-transparent to the light emitted from the UV-light-emitting layer. For example, materials such as $CeO_2$ as for the high refractive index material, and materials such as $CaF_2$, LiF, or $MgF_2$ as for the low refractive index material can also be used.

And, in place of the multi-layer reflecting mirror 22, a semi-transparent metallic film mirror composed of a metallic thin film, such as a Au thin film of a film thickness of 10 nm can also be used.

And, depending on the case, it is also possible to omit the multi-layer reflecting mirror 22. In that case, it is desirable to keep the reflectance for the laser light at the interface on the laser light output side of the UV-light-emitting fluorescent layer 21 or on any interface which is equivalent thereto as high as possible.

And, depending on the necessity, it is also possible to substitute the metallic reflecting mirror 23 with a multi-layer reflecting mirror 22 as has been described above. At that time, in case of using a non electrically conducting material for the multi-layer reflecting mirror, it is preferable to provide a conducting layer on its surface.

WORKING EXAMPLE 2

Figure 4:
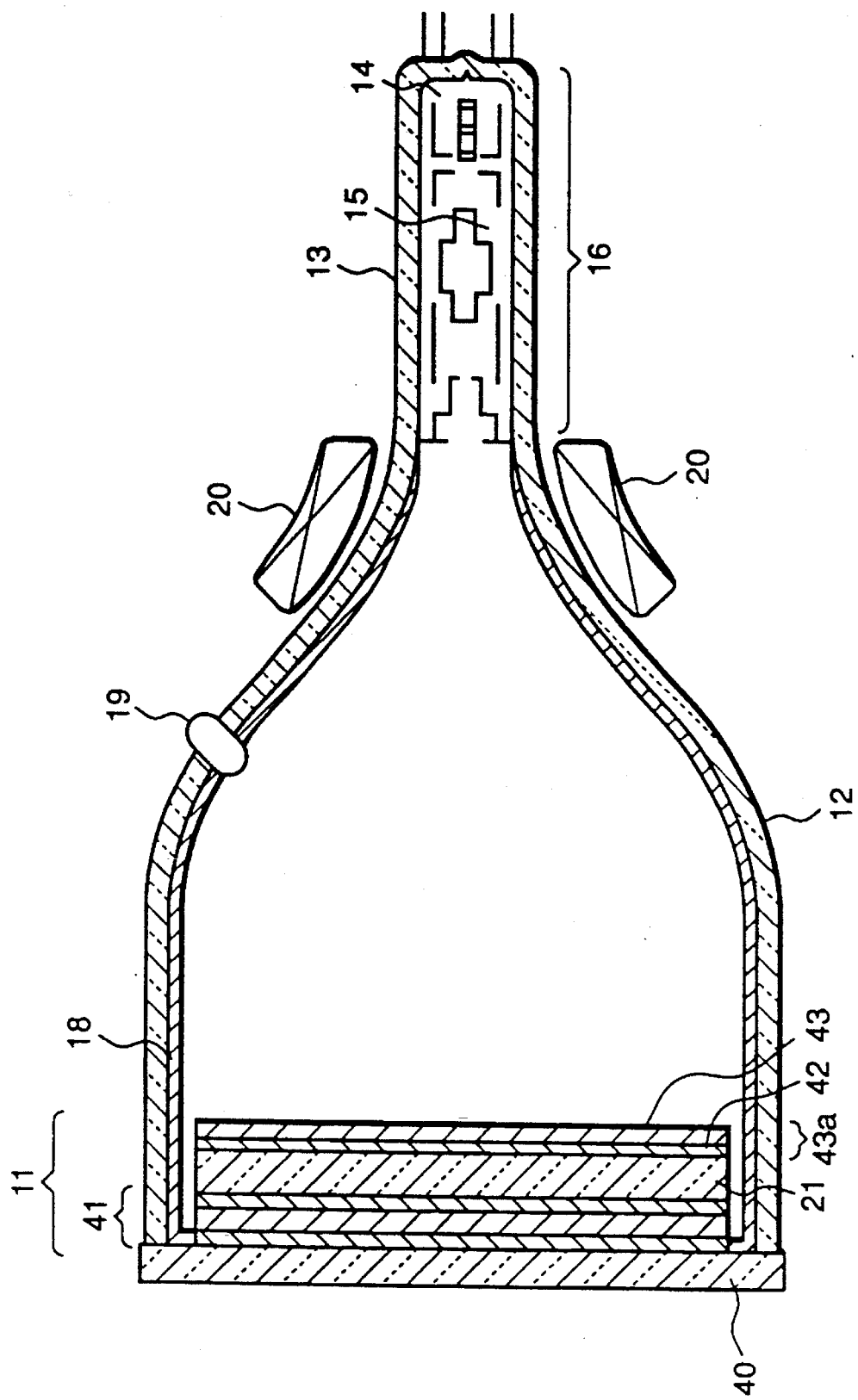
FIG. 4 is a cross-sectional view of a cathode-ray tube used in another working example of a display apparatus of the present invention.

A second working example of the present invention is described below. The difference of the second working example from the first working example is the constitution of the UV-light-emitting fluorescent screen 11 and its making method. FIG. 4 is a cross-sectional view of a cathode-ray tube used in the present second working example. On a transparent substrate 40 made of sapphire single crystal, a semiconductor multi-layer film 41 is formed by stacking in sequence different kinds of ZnMnSSe films having different composition ratios, with respective film thicknesses which are close to an odd-number times of respective quarter-wavelength in those respective films of the emitted light by as many layers as several periods to several tens periods. And thereon, a UV-light-emitting fluorescent material layer 21 made of ZnSSe single crystal film of a specified film thickness is formed. Then Further a back-plane reflecting mirror 43a comprised of a dielectric material thin film 42 made of $SiO_2$ and a metallic thin film 43 made of aluminum is provided. The composition ratio of the ZnSSe alloy crystal composing the UV-light-emission fluorescent material layer 21 was set so that its band gap energy became 3.1 eV. The composition ratio of the ZnMnSSe alloy crystal constituting the semiconductor multi-layer reflecting mirror 41 was set so that its band gap energy became larger than that of the UV-light-emitting fluorescent material layer 21. As for different constituting material other than the above material for the semiconductor multi-layer reflecting mirror 41, a ZnMgSSe thin film, for example, or the likes can also be used.

Operation of the present working example is the same as that of working example 1. An electron beam emitted from an electron gun 16 is accelerated and shot onto the fluorescent screen 11. The electron beam irradiates the UV-light-emitting fluorescent material layer 21 through the back-plane reflecting mirror 42 and it stimulates ZnSSe. ZnSSe emits the UV-light of wavelength of 340 nm to 400 nm which corresponds to the band gap of ZnSSe. The semiconductor multi-layer reflecting mirror 41 and the back-plane reflecting mirror 43a together give high reflectance for the light emitted from the UV-light-emitting fluorescent material layer 21, and hence they act as an optical resonator for this emitted UV-light. That is, the UV-light is bounded back and forth between the reflecting mirrors 41 and 43a, stimulating the UV-light-emitting fluorescent material layer 21 to start the laser oscillation of UV-light of almost the same wavelength. The laser-oscillated light is passed partly through the semi-transparent semiconductor multi-layer reflecting mirror 41 and the transparent substrate 40 and radiated in the forward direction of the cathode-ray tube. This laser light scans over the fluorescent screen 2 responding to scanning of UV-light-emitting spots on the fluorescent material layer 21 and stimulates the visible-light-emitting fluorescent material stripes 32 successively. Thus the visible fluorescent lights of R (red), G (green), and B (blue) are emitted from the visible-light-emitting fluorescent material stripes 32 in the frontward direction.

The display apparatus of the present working example was driven and tested under a specified condition, and the result showed that an excellent display quality including features such as high contrast could be obtained.

Next, making method of the fluorescent screen 11 of the display apparatus of the present working example is explained below. First, over a sapphire single crystal substrate, by using successive molecular beam epitaxial growth methods, two different kinds of ZnMnSSe films having mutually different composition ratios were grown alternately so as to obtain respectively specified film thicknesses for respective films. At that time, such composition ratios were set that their band gap were either wider than the energy corresponding to the emitted light from the UV-light-emitting fluorescent material layer 21, and at the same time mutual difference between respective indices became as large as possible. Furthermore it is preferable to set their respective composition ratios so that their lattice constants became as close to the lattice constant of ZnSSe composing the UV-light-emitting fluorescent material layer 21 as possible. Under the condition for fulfilling the specified requirements mentioned above, the above-mentioned ZnMnSSe single crystal thin films could be grown epitaxially on the above-mentioned sapphire substrate. By stacking these two different kinds of ZnMnSSe thin films alternately with a specified period, the semiconductor multi-layer reflecting mirror 41 was completed.

Thereover the ZnSSe single crystal epitaxial film of a specified film thickness was grown similarly by the molecular beam epitaxial growth method.

Then thereover, an $SiO_2$ film was evaporation-deposited by the electron beam evaporation-deposition method, and successively an aluminum thin film was evaporation-deposited, thereby to complete the back-plane reflecting mirror 43.

The sapphire single crystal substrate, over the surface of which the UV-light-emitting fluorescent screen 11 was formed, was bonded to a glass bulb 12 keeping the UV-light-emitting fluorescent screen 11 to face to the inner face of the glass bulb 12.

WORKING EXAMPLE 3

Next, a third working example of the present invention is described below. Apart from the working example 1 and the working example 2 wherein such cathode-ray tube having the UV-light-emitting fluorescent material face of the laser structure including an optical resonator was used, in the present working example, a cathode-ray tube having conventional structure was used. That is, in FIG. 2 or in FIG. 4, in place of the UV-light-emitting fluorescent material plane 11, a UV-light-emitting fluorescent powder layer, which emits UV-light efficiently by the electron beam excitation, was employed. Thereover a metal-back layer was provided adequately.

For the UV-light-emitting fluorescent powder, for example, materials such as $Ca_3(PO_4)_2:Tl^+$, $BaSi_2O_5:Pb^{2+}$, $(Ba, Sr, Mg)_3Si_2O_7:Pb^{2+}$, $Ca_2MgSi_2O_7:Ce^{3+}$, $Zn_2SiO_4:Ti^+$, $SrB_4O_7F:Eu^{2+}$ can be mentioned, and in the present working example $Ca_3(PO_4)_2:Tl^+$ was employed. And for a metal back layer, an aluminum thin film was used.

An electron beam emitted from an electron gun 16 is accelerated and irradiated into the UV-light-emitting fluorescent powder layer. From the UV-light-emitting fluorescent powder layer, UV-light of a specified wavelength is emitted. Since this UV-light is a spontaneously emitted light, it is emitted diffusively in the frontward direction of the cathode-ray tube 3. This emitted light is collected and collimated into a parallel beam by a projection lens and thereafter expanded through reflecting mirrors 5 and 6 and projected onto the fluorescent screen 2. This UV-light scans over the fluorescent screen 2 and stimulates its fluorescent material stripes 32 successively. Thus the visible fluorescent lights of R, G, and B are emitted in the frontward direction.

When the display apparatus of the present working example was driven and tested under a specified condition, a big size display of direct-viewing type could be realized. The brightness obtained is slightly lower than the levels achieved in the working examples 1 and 2.

WORKING EXAMPLE 4

Figure 5:
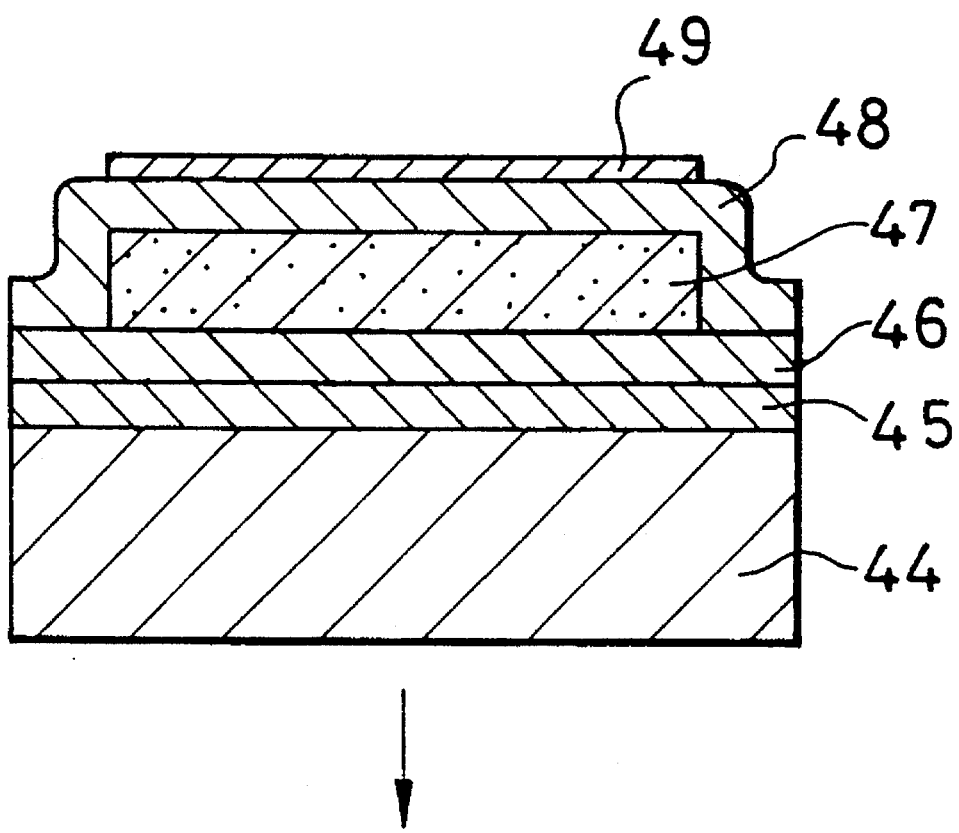
FIG. 5 is a cross-sectional view of a thin film EL device used in another working example of a display apparatus of the present invention.

Next, a fourth working example of the present invention is described below. In the present working example, in place of a cathode-ray tube, a thin film EL device of matrix drive type was used. FIG. 5 shows a cross-sectional view of one pixel of the present working example. A transparent conducting film 45 made of ITO of a thickness of about 200 nm is evaporation-deposited on a glass substrate 44, and thereover an insulating film 46 made of $BaTa_2O_6$ is evaporation-deposited by the RF-spattering method. And thereover, a UV-light-emitting fluorescent material layer 47 of a thickness of about 800 nm made of $ZnF_2:GdF_x$, wherein $Gd^{3+}$ of several molar % was included as the luminescent-center-ions, was provided by the electron beam evaporation-deposition method. And further thereover, an insulating film 48 of a thickness of about 300 nm made of $BaTa_2O_6$ and a counterfacing electrode 49 of a thickness of 200 nm made of aluminum was provided.

When this EL device was driven and tested under a specified condition, UV-light of around 310 nm was emitted efficiently from the UV-light-emitting fluorescent material layer 47. This UV-light was passed through the glass substrate 44 and collected, and collimated into a parallel beam by a projection lens which was provided in front thereof and thereafter expanded through reflecting mirrors 5 and 6 and projected onto the fluorescent screen 2.

The UV-light scanned over the fluorescent screen 2 and stimulated its fluorescent material stripes 32 successively. Thus the visible fluorescent lights of R, G, and B were emitted in the frontward direction.

Although in all of these working examples described above the UV-light was projected onto the fluorescent screen from backside, it is also possible to take such other constitution that the UV-light-emitting source such as a cathode-ray tube or a thin film EL device is placed in front of the fluorescent screen, and the fluorescent screen is stimulated from the frontside.

WORKING EXAMPLE 5

Figure 6:
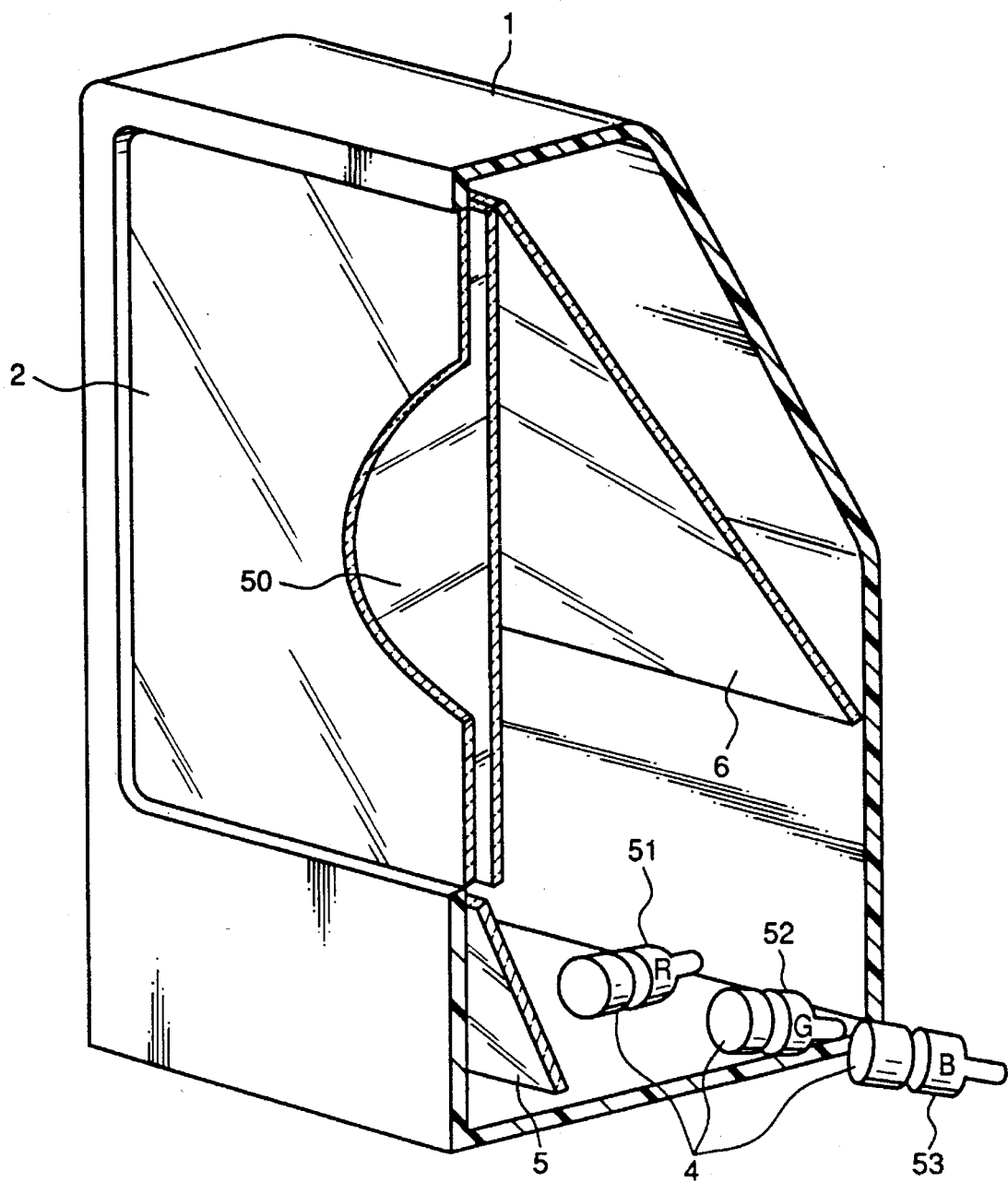
FIG. 6 is a cross-sectional view illustrating a constitution of one working example of a display apparatus of the present invention.

Next, a fifth working example of the present invention is described below. FIG. 6 shows a cross-sectional view of a display apparatus of the present working example. Main differences of constitution of the present working example from the preceding working examples are that a mask 50 is provided at a specified position on the UV-stimulating-light illumination side of the fluorescent screen 2, and that three cathode-ray tubes 51, 52, and 53 for emitting UV-lights for generating lights of colors of R, G, and B, respectively, are provided on one horizontal line.

Figure 7A:
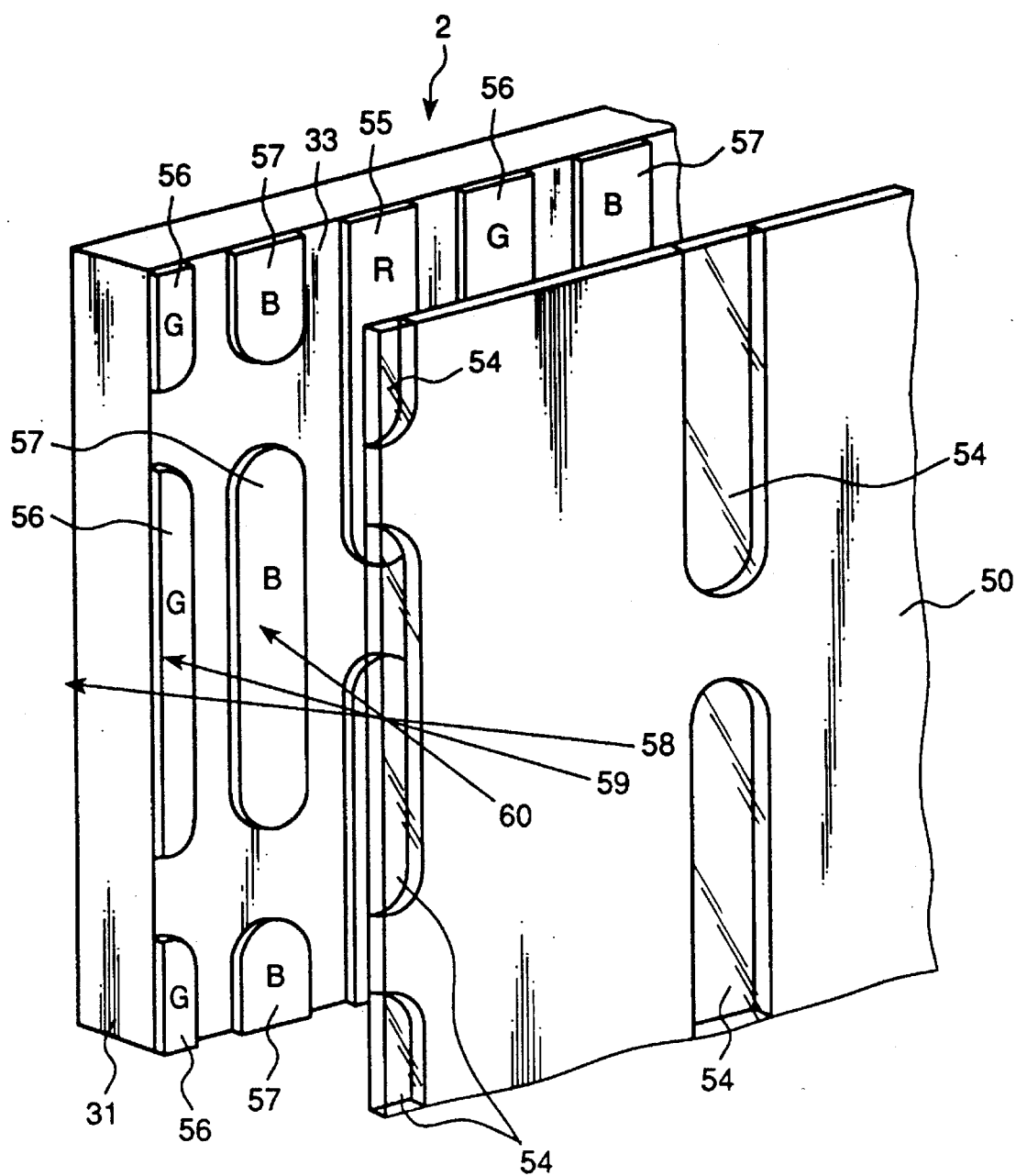
FIG. 7 is an expanded view of in the vicinity of a mask and a fluorescent screen (a) and also an expanded view of in the vicinity of a lens array and the fluorescent screen (b).

In FIG. 7(a), an expanded view of the vicinity of the mask 50 and the screen 2 is shown. On the mask 50, a plural number of UV-light passing slits are provided with a specified spacings. And on the fluorescent screen 2, corresponding to each UV-light passing slit 54, one set of three different kinds of visible-light-emitting fluorescent material dots 55, 56, and 57 respectively of R, G, and B are provided.

In the present working example, for the substrate material of the mask 50, a glass plate, which can transmit the UV-light from the cathode-ray tube, was selected. Thereover, a black paint having resistivity against UV-light radiation was applied over the area excluding those UV-light passing slits, thereby the mask 50 was completed.

Figure 7B:
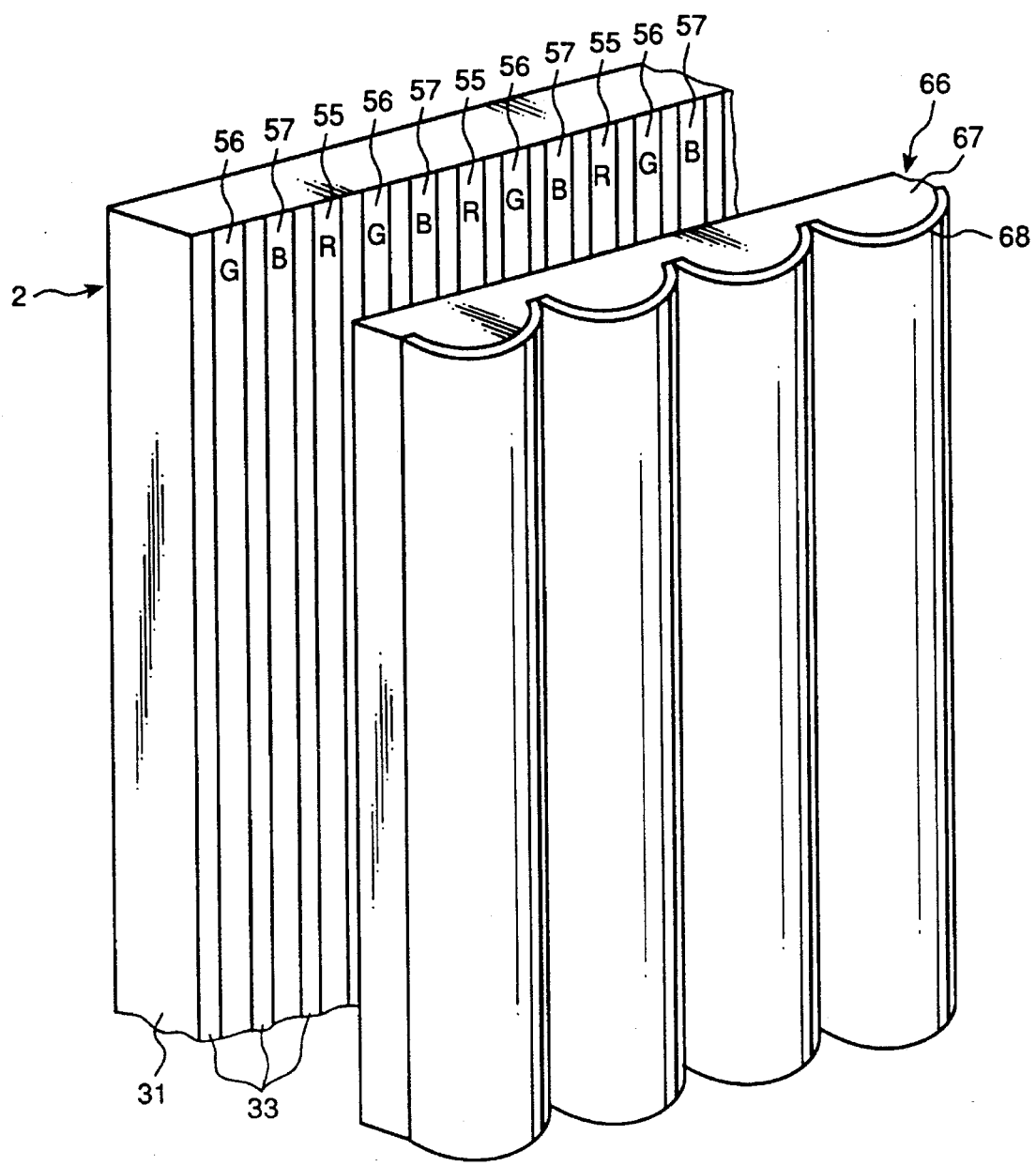
Figure 9:
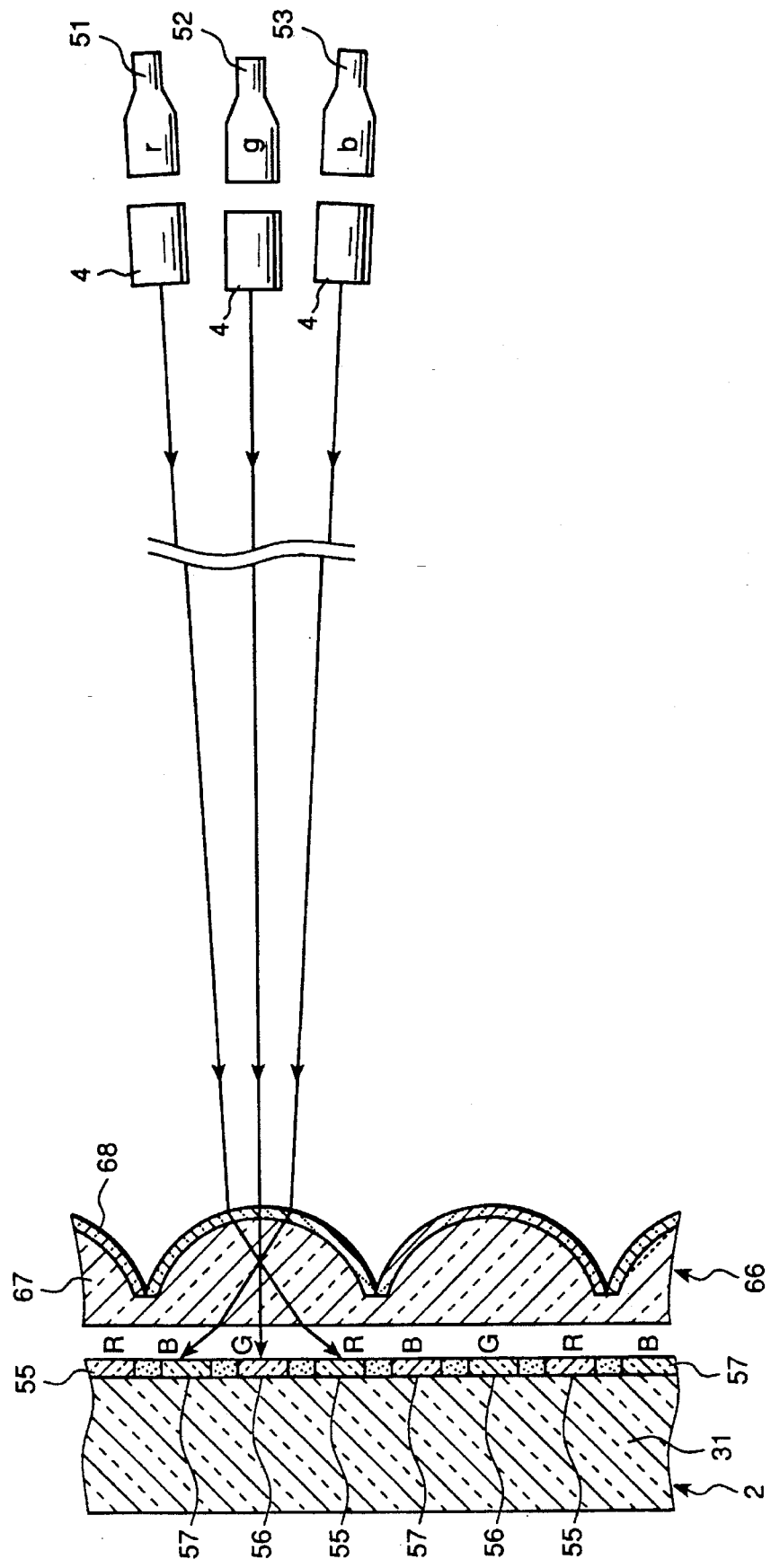
FIG. 9 is a schematic developed plan view showing another example of the present invention.
Figure 10:
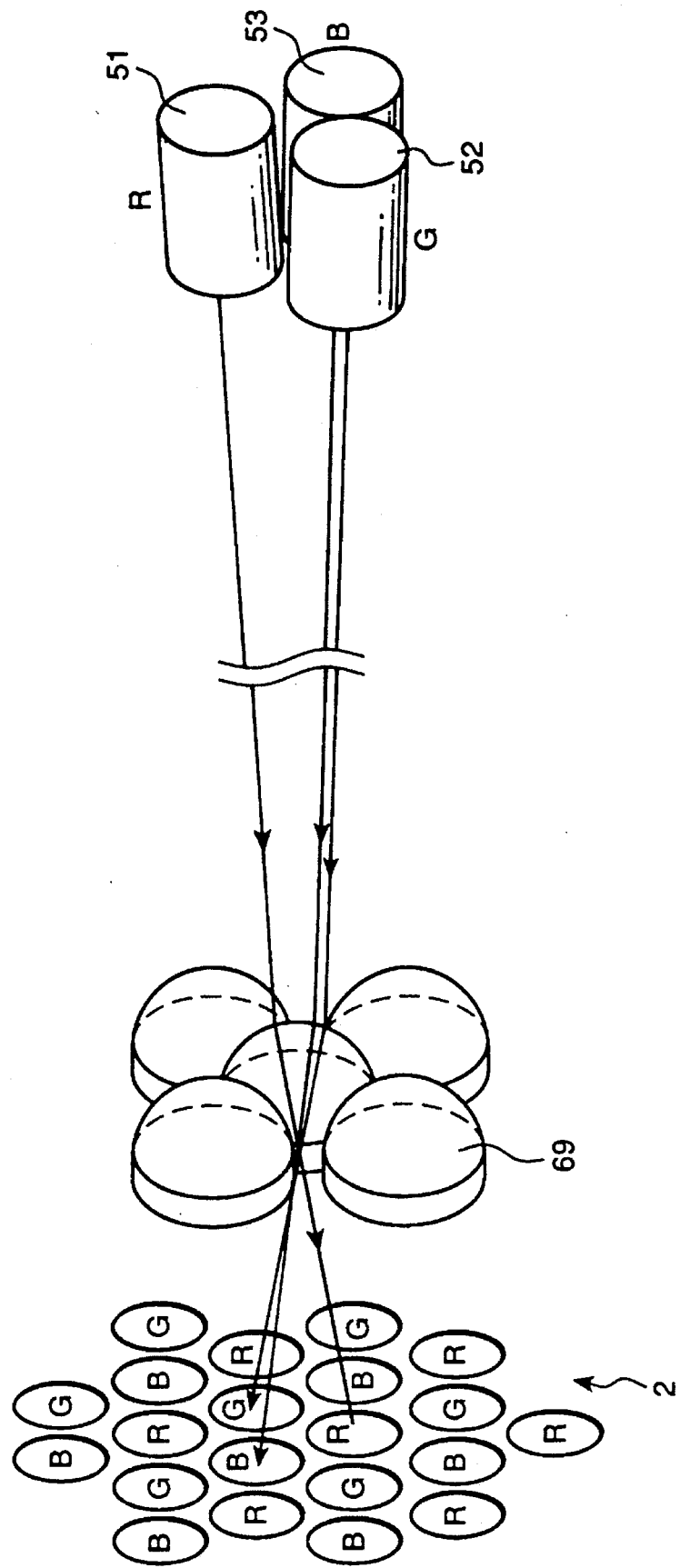
FIG. 10 is a schematic perspective view showing still another example of the present invention.

On the other hand, a lens array mentioned below can also be used. In FIG. 7(b), an expanded view of the vicinity of a lens array 66 and the screen 2 is shown. This lens array 66 is used for letting either one UV-light from either one selected cathode-ray tube (for example, either one of cathode ray tubes 51, 52, or 53 in FIG. 6) to stimulate either one fluorescent material dots which emit one determined visible-light. The lens array 66 is comprised of a lens array substrate 67 and an anti-reflection film 68 covering the surface thereof. The lens array substrate 67 is formed by a shape forming process using a metal mold in a manner that UV-passing glass is formed to take a shape of parallel arrangement of a plural number of cylindrical lenses. Hereupon, it is needless to mention that, when the metal mold was made, rays of light beams from respective cathode-ray tubes were computed using a computer, thereby an optimum design was sought. One set of visible-light-emitting fluorescent stripes of red 55, green 56, and blue 57 is arranged in a manner that they correspond to one cylindrical lens of the lenticular lens. By using this lens array 66, almost 90% of the UV-light emitted from the projection lens 4 is projected on the fluorescent screen 2. FIG. 9 is a developed sectional view schematically shows positional relations of the CRTs 51, 52 and 53 with regard to the lens array 66 and the fluorescent screen 2. Apart from the above working example, wherein the cathode-ray tubes 51, 52 and 53 are arranged on one horizontal line, it is also possible to arrange them for example, in a triangular shape depending upon the necessity. FIG. 10 schematically shows such configuration. In this triangular shaped arrangement, the lens array takes such a configuration that ordinary disk-shape lenses 69 having substantially hemispherical faces are densely arranged on a plane without leaving space therebetween. And the fluorescent screen 2 is formed also in a manner that red, green, and blue light-emitting fluorescent material dots are arranged in the triangular shape.

For the fluorescent material for forming the fluorescent material dots 55, 56, and 57, the same material used in the first working example can be used. For the making method, a printing method, which is similar to that of the first working example, was used.

In order to form specified fluorescent material dots at relatively appropriate positions with respect to the UV-light passing slits, when original art works (i.e., pattern designing) of the mask 50, the lens array 66, and the fluorescent material dots, were done, exposuring light rays of light beams from respective cathode-ray tubes were computed by using a computer, and thereby an optimum design was sought.

Video signals, by which the UV laser light of outputs corresponding to the brightness signal for respective R, G, and B are emitted, are inputted to the cathode-ray tubes 51, 52, and 53.

Those stimulating lights from respective cathode-ray tubes 51, 52, and 53 are expanded by projection lenses disposed respectively in front thereof. The light beams of respective stimulating lights can be passed therethrough only at the place of the UV-light passing slits which are provided on the mask and projected onto the visible-light-emitting fluorescent material dots 55 to 57, thereby to emit the fluorescent lights. Light beams emitted from specified light-emitting points on the face plate of respective cathode-ray tubes arrive at respective UV-light passing slits of the mask. Then after passing through the UV-light passing slits, they travel straight without being bent and arrive at the fluorescent screen plane. However, since respective cathode-ray tubes are disposed at mutually separate places, the incident direction and the angle of respective light beams arriving at a certain UV-light passing slits are different respectively. Accordingly, the respective arrival positions on the fluorescent screen for respective light beams differ respectively. The visible-light-emitting fluorescent material dots 55, 56, and 57 are placed at respective relative positions at which only those light beams 58, 59, and 60 of those stimulating lights emitted from cathode-ray tubes respectively for R, G, and B are projected thereonto, and therefore the light beam 58, for example, of UV stimulating light from the cathode-ray tube 51 for R illuminates only R light-emitting fluorescent material dots 55 selectively, but it never illuminates G light-emitting fluorescent material dots 56 nor B light-emitting fluorescent material dots 57. A trial in which the mask was replaced by a lens array could give the same result.

In the working examples 1 through 4 described above, there were possibility of occurring of such an inconvenience in which the stimulating light corresponding to the red signal, for example, is projected onto the blue Fluorescent stripe because the illumination position of the light beam of the stimulating light drifts as time lapses due to, for example, its thermal drift. In the present working example, however, since the stimulating light from the R cathode-ray tube, for example, necessarily illuminates only the R fluorescent material dots 55, there is no such fear. That is, in accordance with the present working example, a fluorescent screen hardly having color drifting or changes in rather short time can be obtained.

When the display apparatus of the present working example was driven and tested under a specified condition, similarly as in the preceding working examples, a big size display of high quality and high brightness and of eliminating color displacement occurring along time lapse could be realized.

Apart from the above-mentioned example wherein each one cathode-ray tube for each color of R, G, and B was provided, that is, three cathode-ray tubes in total were provided, a modified example may be made such that, for such case of requiring a further higher brightness, a plural number of cathode-ray tubes for each color, for example, two tubes for each color, that is, six tubes in total can also be used.

And for the material for the mask 50, besides the material used in the working example described above, for example, a metal plate on which holes are opened with a specified spacing can also be used.

And, in the above working example, although the cathode-ray tubes were arranged on one horizontal line, it is also possible to arrange them for example, in a triangular shape in accordance with the necessity.

Next, making method of the fluorescent screen 2 used in the present working example is explained below. The mask itself or a plate equivalent to the mask was placed at a specified position from the fluorescent screen plane as an exposure mask. The relative position between this exposure mask and the fluorescent screen was set to be equal to the relative position between the fluorescent screen and the mask in the present working example in its actual use.

As exposure light sources for the visible-light-emitting fluorescent material dots of respective colors of the fluorescent screen, the UV-light sources themselves or certain light sources, which could project equivalent light beams onto the fluorescent screen, were usable accompanied with specified projection lenses placed at specified respective positions. That is, the positions of the light sources were determined so that at least the ray trajectories through the UV-light-passing slits of the exposure mask down to the fluorescent screen travel through the relative position which are the same as the ray trajectories in a completed actual display apparatus.

First, a photosensitive negative resist in which powder R of a visible-light-emitting fluorescent material for R was mixed was coated over the fluorescent screen. Next an exposure light source "r" for the fluorescent powder R was turned on to let it emit the UV-light. This UV-light was expanded by the projection lens, and then its light beam was projected on the UV-light passing slits provided on the mask and only those parts thereof which has passed through the UV-light passing slits were projected on the fluorescent screen as the light beams having the same shape as the UV-light passing slits. Only in those parts of the fluorescent screen which were illuminated by the UV-light, the photosensitive negative resist was exposed. Therefore, the visible-light-emitting fluorescent material dots having the same shape as the UV-light passing slits were fixed on the fluorescent screen. Thereafter by washing the fluorescent screen, the visible-light-emitting fluorescent powder R attached on other parts than those dot-fixed parts was rinsed out.

Next, a photosensitive negative resist, in which powder G of a visible-light-emitting fluorescent material for G was mixed, was coated over the fluorescent screen. Then a different exposure light source "g" was lit to emit the UV-light. This UV-light was expanded by the projection lens, then its light beam was projected on the UV-light passing slits provided on the mask and only those parts thereof which has passed through the UV-light passing slits were projected on different parts than the visible-light-emitting fluorescent material dots "R" on the fluorescent screen as the light beams having the same shape as the UV-light passing slits. Only in those parts of the fluorescent screen which were illuminated by the UV-light, the photosensitive negative resist was exposed. Therefore, the visible-light-emitting fluorescent material dots g having the same shape as the UV-light passing slits were fixed on the fluorescent screen. Thereafter, by washing the fluorescent screen, the visible-light-emitting fluorescent powder G attached on other parts than those dot-fixed parts was rinsed out.

The similar process was applied also on a visible-light-emitting fluorescent material powder for B, thereby the visible-light-emitting fluorescent material dots "b" were formed.

Next, a photosensitive positive resist in which carbon powder was mixed was coated over the fluorescent screen. Then, all the exposure light source were turned on to let it emit the UV-light. Thereby the UV-lights were projected on parts for all of those visible-light-emitting fluorescent material dots of "R", "G", and "B". Thereafter by washing the fluorescent screen, the carbon powder covering respective visible-light-emitting fluorescent material dots was rinsed out. Thereby a black matrix layer could be formed over those parts other than respective fluorescent material dots. Thus, by the processes described above, the fluorescent screen was completed. By using a lens array in place of the mask, a similar fluorescent screen could be completed.

Hereupon, after finishing the above-mentioned processes, depending on necessity, it is also possible to remove those residual resin composition left in the fluorescent material dots and the black matrices by such as heating.

WORKING EXAMPLE 6

Figure 8:
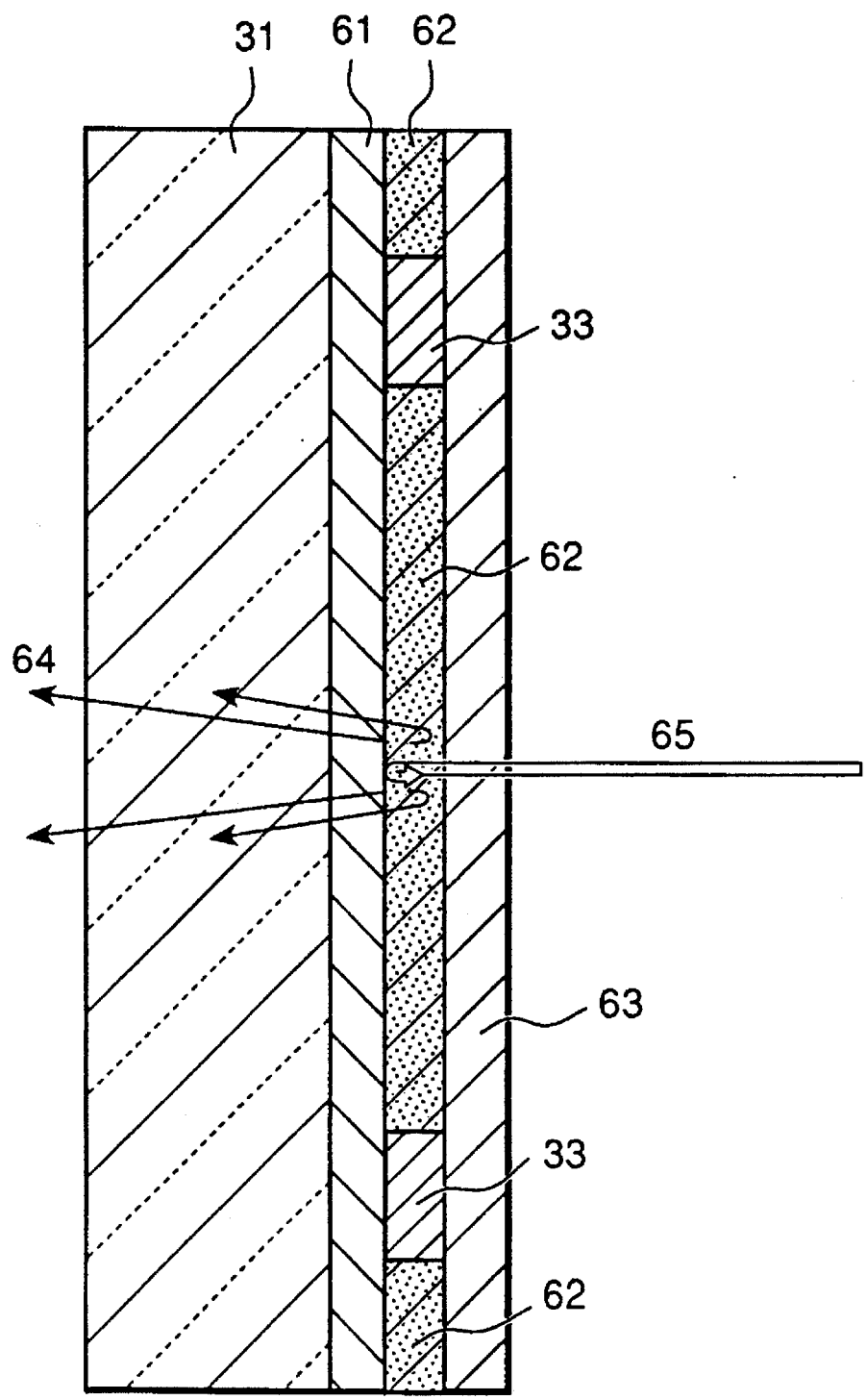
FIG. 8 is a cross-sectional view of a cathode-ray tube used in one working example of a display apparatus of the present invention.

A sixth working example of the present invention is explained below. FIG. 8 is a cross-sectional view of a fluorescent screen of the present working example. On the back-face side of the screen substrate 31, a UV-light cut filter 61 having a resistivity against a UV-light exposure is provided. As for the UV-light cut filter material, an appropriate material of either inorganic or organic can be applied. Thereover, visible-light-emitting fluorescent material dots 62 and black matrices 33 are provided. Furthermore, thereover a visible-light reflecting layer 63 is provided.

For the UV-light cut filter 61, a material, which passes the visible-light emission 64 from the visible- light-emitting fluorescent material dots 62 and absorb the UV-light from a UV-light source, was used. And for a visible-light reflecting mirror 63, such mirror as configurated as follows was used. That is the mirror 63 comprises a glass substrate which is transparent for the UV stimulating light. And a specified dielectric multi-layer film, which passes the UV stimulating light 65 but reflects respective R-, G-, and B- visible-light emissions 64, was evaporation-deposited on the glass substrate.

In accordance with the present working example, the following technical effects could be obtained. That is, since the UV-light cut filter could cut the UV stimulating light 65, harmful UV-light leakage toward the TV watcher in front of the front face of the fluorescent screen could be eliminated. And, since the visible-light reflecting layer 63 reflects the visible-light emissions 64 toward from the fluorescent material dots 62, the brightness of the dots 62 was enhanced.

Hereupon, instead of providing the UV-light cut filter 61 adjacent to the screen, another configuration may be made such that a material allowing no UV-light transmission as a screen substrate 31 itself. And in place of the UV-light cut filter 61, it is also possible to use a UV-light reflecting mirror made of a specified dielectric multi-layer film which passes the respective R-, G- and B- visible-light emissions 64 but reflects the UV stimulating light 65. This UV-light reflecting mirror prevents leakage of the UV-light toward the TV watcher in front of the front face of the fluorescent screen. And at the same time, the obtained brightness was improved, since the UV-light which could not be absorbed completely by the fluorescent material dots are made re-enter onto those dots by the reflection mirror.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A display apparatus comprising:
    an EL apparatus, which is provided for emitting rays of UV image from its light emitting face, and which comprises:
        a UV-emitting layer including a UV-emitting fluorescent material which is to be excited by electric field application,
        a dielectric layer provided on at least one face of said UV-emitting layer, and
        a pair of electrodes which is provided in a manner to oppose each other interposing said UV-emitting layer and said dielectric layer therebetween, at least one of said electrode being transparent or translucent,
    a projection lens system provided on paths of the rays of UV image for projecting a UV image of the light emitting face, and
    a fluorescent screen for emitting visible lights when lit up by the rays of UV image through the projection lens system.

2. A display apparatus in accordance with claim 1, wherein
    a light mask having a plurality of UV light passing parts is provided between said projection lens system and said fluorescent screen.

3. A display apparatus in accordance with claim 1, wherein
    a lens array for deflecting UV light is provided between said projection lens system and said fluorescent screen.

4. A display apparatus in accordance with claim 3, said apparatus further comprising:
    three UV light sources disposed substantially on a line which is substantially perpendicular to an optical axis of either one of the UV light sources, and
    a lens array comprising a number of cylindrical lenses disposed in a manner that longitudinal direction of each cylindrical lens being perpendicular to said line.

5. A display apparatus in accordance with claim 1, 2 or 3 which further comprises:
a UV cut filter or UV reflection mirror at a position opposite to said projection lens system with respect to the fluorescent layer of said fluorescent screen.

6. A display apparatus in accordance with claim 1, wherein
said UV light source is a CRT comprising a UV-emitting fluorescent material which is excited by electron beam bombardment.

7. A display apparatus in accordance with claim 6, wherein said CRT comprises:
a facial light emitting layer having a UV-emitting fluorescent material, and
a reflection mirror disposed on at least one side of said facial light emitting layer.

8. A display apparatus in accordance with claim 6 or 7, wherein
said UV-emitting fluorescent material is at least one member selected from the group consisting of phosphate compounds, silicate compounds, yttrium oxide compounds, tungsten oxide compounds, aluminum oxide compounds, rare earth oxides, IIa-VII$_2$ compounds IIb-VII$_2$ compounds and alkali-halides.

9. A display apparatus comprising:
a UV light source for emitting rays of UV image from its light emitting face,
a projection lens system provided on paths of the rays of UV image for projecting a UV image of the light emitting face,
a fluorescent screen for emitting visible lights when lit up by the rays of UV image through the projection lens system, and
three UV light sources disposed substantially on a triangle which is substantially perpendicular to an optical axis of either one of the UV light sources, and
a lens array comprising a number of lenses disposed in the same direction as that of said UV light source, said lens array provided between said projection lens system and said fluorescent screen.

10. A display apparatus in accordance either one of claim 1 to 5 which further comprises:
a visible light reflection mirror disposed between said fluorescent screen and said projection lens.

11. A display apparatus comprising:
a UV light source for emitting rays of UV image from its light emitting face,
a projection lens system provided on paths of the rays of UV image for projecting a UV image of the light emitting face, and
a fluorescent screen for emitting visible lights when lit up by the rays of UV image through the projection lens system, wherein
said UV light source is a CRT comprising a UV-emitting fluorescent material which is excited by electron beam bombardment, and wherein
said UV-emitting fluorescent material is at least one member selected from the group consisting of diamond, silicon, carbide, III-V compound semiconductors, IIb-VI compound semiconductors, IIa-VI compound semiconductors, chalcopyrite compounds and manganese calcogenite compounds.

12. A display apparatus in accordance with claim 11, wherein
said UV-emitting fluorescent material comprises a donor type impurity or acceptor type impurity.

13. A display apparatus in accordance with claim 11, wherein
said fluorescent material comprises luminescent center impurity of either of lanthanoids ion or actinoids ion having f-electron shell.

14. A display apparatus in accordance with claim 13, wherein
said luminescent center impurity is gadolunium ion.

15. A display apparatus according to claim 11, wherein said CRT comprises:
a facial light emitting layer having a UV-emitting fluorescent material, and
a reflection mirror disposed on at least one side of said facial light emitting layer.

16. A display apparatus in accordance with claim 15, wherein said UV-emitting fluorescent material comprises a donor type impurity or acceptor type impurity.

17. Method for making fluorescent screen for display apparatus comprising:
a UV light source which emits rays from a image emitted from its UV light emitting face,
a projection lens system provided on a path of said UV light for projecting UV rays from image of said light emitting face,
a fluorescent screen for emitting visible-light when lit up by UV rays through said projection lens system, and
a mask, which is disposed on said path between said projection lens and said fluorescent screen and passes UV rays which are emitted from said image, the method comprising the steps of:
disposing a pattern exposing light source at such a position that said UV light source is to be disposed for projecting said UV light image through said projection lens on a desired irradiating region on said fluorescent screen at a given position,
disposing said mask at such predetermined position as to make a predetermined gap from said fluorescent screen,
coating a negative photoresist film containing a visible-light-emitting fluorescent material on said fluorescent screen,
disposing said fluorescent screen at said given position,
exposing said negative photoresist film to said pattern-exposing light source, and
developing said photoresist film after said exposing, thereby to obtain a desired pattern of said visible-light-emitting fluorescent material.

18. Method for making fluorescent screen for display apparatus in accordance with claim 17, wherein
said pattern exposing light source is a UV light source.

19. Method for making fluorescent screen for display apparatus comprising:
a UV light source which emits rays from a image emitted from its UV light emitting face,
a projection lens system provided on a path of said UV light for projecting UV rays from image of said light emitting face,
a fluorescent screen for emitting visible-light when lit up by UV rays through said projection lens system, and
a lens array, which is disposed on said path between said projection lens and said fluorescent screen and deflects UV rays, the method comprising the steps of:
disposing a pattern exposing light source at such a position that said UV light source is to be disposed for projecting said UV light image through said projection lens on a desired irradiating region on said fluorescent screen at a given position, disposing said lens array at such predetermined position as to make a predetermined gap from said fluorescent screen, coating a negative photoresist film containing a visible-light-emitting fluorescent material on said fluorescent screen, disposing said fluorescent screen at said given position, exposing said negative photoresist film to said pattern-exposing light source, and developing said photoresist film after said exposing, thereby to obtain a desired pattern of said visible-light-emitting fluorescent material.

20. Method for making fluorescent screen for display apparatus in accordance with claim 19, wherein said pattern exposing light source is a UV light source.

21. A display apparatus comprising:

a UV light source for emitting rays of UV image from its light emitting face, a projection lens system provided on paths of the rays of UV image for projecting a UV image of the light emitting face, a fluorescent screen for emitting visible lights when lit up by the rays of UV image through the projection lens system, and a UV cut filter or UV reflection mirror at a position opposite to said projection lens system with respect to the fluorescent layer of said fluorescent screen.

\* \* \* \* \*